(12) United States Patent
　　　Siomina

(10) Patent No.: US 10,412,692 B2
(45) Date of Patent: Sep. 10, 2019

(54) D2D POWER CONTROL

(71) Applicant: Telefonaktiebolaget LM Ericsson (publ), Stockholm (SE)

(72) Inventor: Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 59 days.

(21) Appl. No.: 15/501,361

(22) PCT Filed: Aug. 7, 2015

(86) PCT No.: PCT/SE2015/050858
§ 371 (c)(1),
(2) Date: Feb. 2, 2017

(87) PCT Pub. No.: WO2016/022065
PCT Pub. Date: Feb. 11, 2016

(65) Prior Publication Data
US 2017/0230919 A1　　Aug. 10, 2017

Related U.S. Application Data

(60) Provisional application No. 62/035,220, filed on Aug. 8, 2014, provisional application No. 62/035,068, filed on Aug. 8, 2014.

(51) Int. Cl.
*H04W 72/04*　　(2009.01)
*H04W 52/38*　　(2009.01)
*H04W 52/34*　　(2009.01)
*H04W 76/14*　　(2018.01)

(52) U.S. Cl.
CPC ....... *H04W 52/383* (2013.01); *H04W 52/346* (2013.01); *H04W 76/14* (2018.02)

(58) Field of Classification Search
CPC ......... H04W 52/0206; H04W 52/0209; H04W 52/0212; H04W 52/18; H04W 52/36; H04W 52/383; H04W 52/386; H04W 52/346; H04W 76/14
See application file for complete search history.

(56) References Cited

U.S. PATENT DOCUMENTS

| | | | |
|---|---|---|---|
| 6,751,444 B1 | 6/2004 | Meiyappan | |
| 9,554,388 B2 * | 1/2017 | Li | ........................ H04W 72/082 |
| 2007/0053418 A1 | 3/2007 | Goldburg | |

(Continued)

FOREIGN PATENT DOCUMENTS

WO　　2014/088792 A1　　6/2014

OTHER PUBLICATIONS

International Search Report and Written Opinion dated Oct. 21, 2015 for International Application Serial No. PCT/SE2015/050858, International Filing Date: Aug. 7, 2015 consisting of 9-pages.

(Continued)

*Primary Examiner* — Hassan Kizou
*Assistant Examiner* — Mahbubul Bar Chowdhury
(74) *Attorney, Agent, or Firm* — Patent Portfolio Builders, PLLC

(57) ABSTRACT

A method for operating a D2D enabled node. The method includes controlling the D2D transmit power of the D2D enabled node. The controlling is performed based on one or more conditions or parameters.
Related devices and methods are also provided.

6 Claims, 8 Drawing Sheets

(56) References Cited

U.S. PATENT DOCUMENTS

| | | | | |
|---|---|---|---|---|
| 2009/0325625 A1* | 12/2009 | Hugl | ............... | H04W 52/16 455/522 |
| 2013/0178221 A1* | 7/2013 | Jung | ............... | H04L 9/0844 455/450 |
| 2013/0230032 A1* | 9/2013 | Lu | ............... | H04W 72/02 370/336 |
| 2014/0010209 A1* | 1/2014 | Hakola | ............... | H04W 24/02 370/336 |
| 2014/0094213 A1* | 4/2014 | Khoshnevis | ............... | H04W 52/383 455/522 |
| 2015/0133132 A1* | 5/2015 | Li | ............... | H04L 1/0002 455/450 |
| 2015/0327180 A1* | 11/2015 | Ryu | ............... | H04L 1/00 370/329 |
| 2015/0327188 A1* | 11/2015 | Bagheri | ............... | H04W 52/383 455/426.1 |
| 2015/0373730 A1* | 12/2015 | Fujishiro | ............... | H04L 1/0003 455/450 |
| 2016/0057709 A1* | 2/2016 | Gao | ............... | H04W 52/243 455/452.2 |
| 2016/0142898 A1* | 5/2016 | Poitau | ............... | H04W 76/14 370/329 |
| 2016/0183276 A1* | 6/2016 | Marinier | ............... | H04W 72/02 370/329 |
| 2017/0086150 A1* | 3/2017 | Wang | ............... | H04W 52/00 |
| 2017/0208554 A1* | 7/2017 | Hoshino | ............... | H04W 52/247 |
| 2017/0230918 A1* | 8/2017 | Ryu | ............... | H04W 52/383 |

OTHER PUBLICATIONS

3GPP TSG-RAN WG1 Meeting #78 R1-143374, Title: "On Power Control for D2D Communication," Agenda Item: 7.2.3.2.2, Source: Ericsson, Document for: Discussion and Decision, Conference Location and Date: Dresden, Germany, Aug. 18-22, 2014 consisting of 4-pages.

3GPP TSG-RAN WG1 Meeting #77 R1-142454, Title: "WAN Protection by Configurable D2D Transmission Power Control," Agenda item: 6.2.5.4, Source: NSN, Nokia, Document for: Discussion and Decision, Conference Location and Date: Seoul, Korea, May 19-23, 2014 consisting of 3-pages.

EP Office Action received in corresponding application No. 15753510.5 dated May 23, 2018. 6 pages.

* cited by examiner

D2D POWER CONTROL

CROSS-REFERENCE TO RELATED APPLICATIONS

This application is a Submission Under 35 U.S.C. § 371 for U.S. National Stage Patent Application of International Application Number: PCT/SE2015/050858, filed Aug. 7, 2015 entitled "D2D POWER CONTROL," which claims priority to U.S. Provisional Application No. 62/035,068, filed Aug. 8, 2014, and U.S. Provisional Application No. 62/035,220, filed Aug. 8, 2014, the entirety of all of which are incorporated herein by reference.

TECHNICAL FIELD

The present disclosure pertains to D2D communication in wireless communication networks, in particular to power control for D2D communication.

BACKGROUND

D2D communication is becoming a feature of wireless networks, often in addition to more centralized communications, e.g. cellular communication. With the introduction of D2D technologies new challenges for providing an efficient and reliable communication arise, e.g. in regards to power control. Already available power control structures may not be suitable in the context of D2D communication or do not accommodate for this new way of communication.

SUMMARY

Better means for D2D power control are needed.

There is disclosed a method for operating a network node in a wireless communication network, the method comprising determining a D2D transmit power configuration based on at least one D2D power-related parameter or D2D power control parameter and/or determining at least one D2D power-related parameter or D2D power control parameter. Thus, the network node may determine a parameter or configuration suitable for power control of a D2D enabled node.

A network node for a wireless communication network is also disclosed. The network node is adapted for determining a D2D transmit power configuration based on at least one D2D power-related parameter or D2D power control parameter and/or determining at least one D2D power-related parameter or D2D power control parameter.

There is disclosed a method for operating a D2D enabled node, comprising controlling the D2D transmit power of the D2D enabled node, wherein the controlling is performed based on one or more conditions or parameters.

Moreover, there is disclosed a D2D enabled node for a wireless communication network, the D2D enabled node being adapted for controlling the D2D transmit power of the D2D enabled node, wherein the controlling is performed based on one or more conditions or parameters.

A computer program product comprising instructions executable by control circuitry is also suggested. The instructions cause the control circuitry to carry out and/or control any one of the methods disclosed herein when executed by the control circuitry.

A storage medium adapted to store instructions executable by control circuitry is considered. The instructions cause the control circuitry to carry out and/or control any one of the methods when executed by the control circuitry.

BRIEF DESCRIPTION OF THE DRAWINGS

The drawings are provided to illuminate and illustrate concepts described herein, without limiting them to the subject matter shown in the figures, which show.

DETAILED DESCRIPTION

Figure 2:
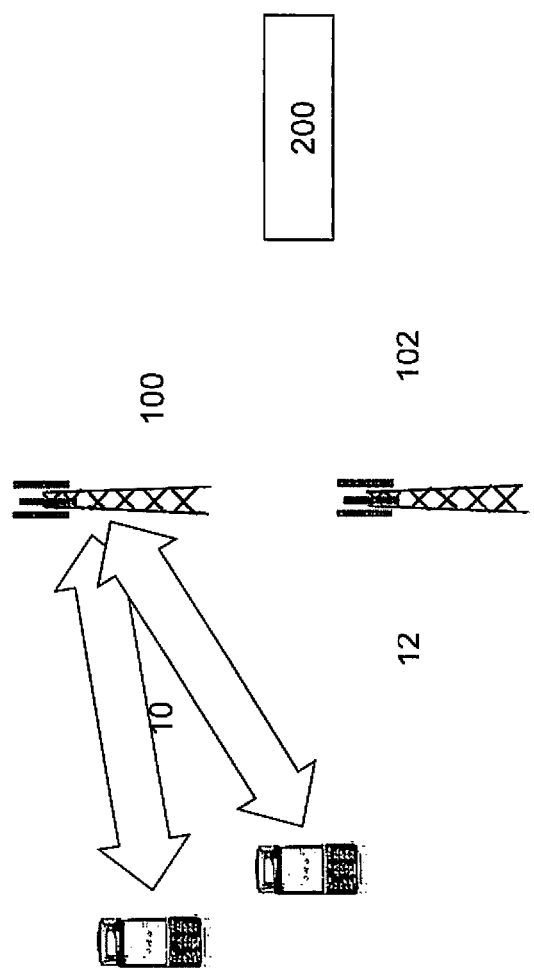
FIG. 2 a "Locally-routed" data path in the EPS for communication between two UEs when UEs are served by the same eNBs.
Figure 3:
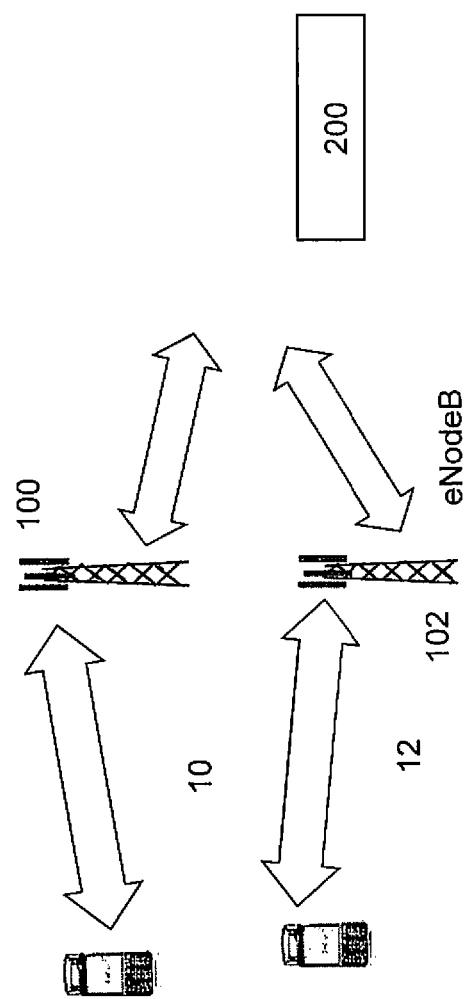
FIG. 3 a default data path scenario in the EPS for cellular communication between two UEs.

If D2D enabled nodes or UEs are in proximity to each other, they may be able to use a "direct mode" (e.g., as in FIG. 1) or "locally-routed" (e.g., as in FIG. 2) path for data communication, unlike in the conventional cellular communication (FIG. 3). In such device-to-device communication (D2D), which may also be called "ProSe" (for PROximity SErvices), the source and the target are wireless devices like D2D enabled nodes, e.g., UEs. Some of the potential advantages of D2D or ProSe are off-loading of the cellular network, faster communication, increased awareness of surrounding wireless devices of interest (e.g., running the same application), higher-quality links due to a shorter distance, etc. Some appealing applications of D2D communications are video streaming, online gaming, media downloading, peer-to-peer (P2P), file sharing, etc.

Generally, a UE may be considered as an example or representative of a D2D enabled node, and the term D2D enabled node may be interchanged for UE unless explicitly stated otherwise.

Figure 1:
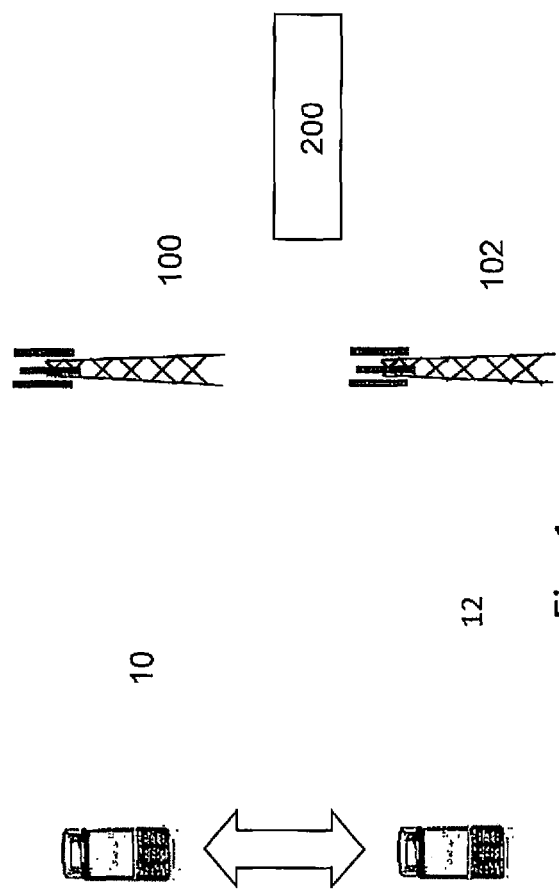
FIG. 1 a "Direct mode" data path in the EPS for communication between two UEs.

In FIGS. 1 to 3, there are shown different setups for communication of user equipments within a wireless communication network. In these figures, the first node or first user equipment UE1 is indicated with reference numeral 10, the second node or second user equipment is indicated with reference numeral 12. A first base station, which may be an eNodeB and/or EPC according to LTE/E-UTRAN, carries the reference numeral 100, whereas a second base station, which may be an eNodeB and/or EPC according to LTE/UTRAN, is referenced with numeral 102.

The nodes 100, 102 may be configured as coordinating nodes for D2D communication between the UEs 10, 12. Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

If UEs 100, 102 are in proximity to each other, they may be able to use a "direct mode" (e.g., as in FIG. 1) or "locally-routed" (e.g., as in FIG. 2) path for data communication, unlike in the conventional cellular communication (FIG. 3).

Figure 4:
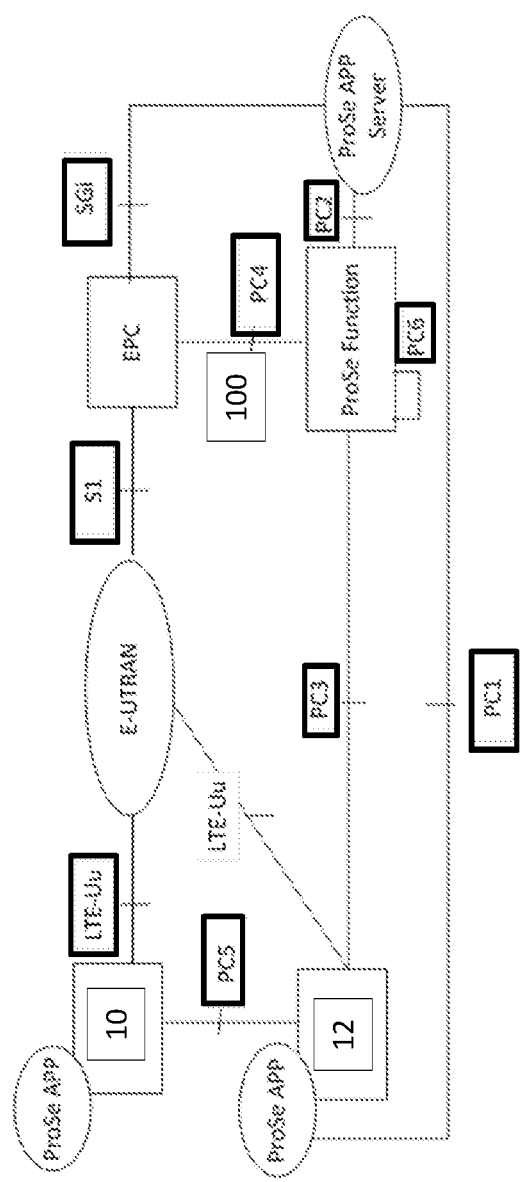
FIG. 4 an exemplary D2D architecture.

A detailed example reference architecture for D2D operation according to one possible LTE/E-UTRAN implementation is illustrated in FIG. 4, in which only a setup with two UEs 10, 12 connected to a common base station or eNodeB 100 is shown. In FIG. 4, PCn identifies different reference points or interfaces. PC1 refers to a reference point between a ProSe application ProSe APP running on a D2D enabled node or UE 10 or 12, PC2 refers to a reference point between a ProSe Application server and a ProSe function provider on a server or base station side. PC3 indicates a reference point between the D2D enabled node or UE 12 and the ProSE function, e.g. for discovery and/or communication. PC4 refers to a reference point between the EPC and the ProSe function, e.g. for setting up one-to-one communication between UEs 10 and 12. PC5 is a reference point between D2D enabled node or UE 10 and D2D enabled node or UE 12, e.g. a first node and a second node involved in D2D communication, which may be used e.g. for direct or relayed communication between the UEs. PC6 identifies a reference point between ProSE functions of different networks, e.g. if UEs 10, 12 are subscribed to different PLMNs (Public Land Mobile Networks). SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the UEs 10, 12 and the base station 100.

Figure 5:
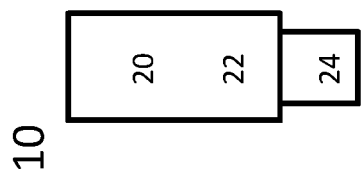
FIG. 5 an exemplary D2D enabled node or UE.

FIG. 5 schematically shows a D2D enabled node or user equipment 10, which may be a node of a device-to-device communication, in closer details. User equipment 10 comprises control circuitry 20, which may comprise a controller connected to a memory. An receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation data.

Figure 6:
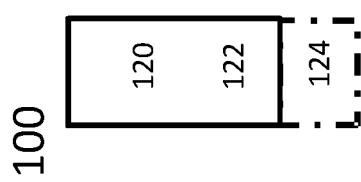
FIG. 6 an exemplary base station or network node.

FIG. 6 schematically show a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to facilitate signal reception or transmittance and/or amplification.

Power control for cellular UL is described in the following.

UL power control (in particular in cellular operation) may control the transmit power of the different UL physical channels. In E-UTRAN, the UL power control has both an open loop component and a closed loop components. The former is derived by the D2D enabled node or UE in every subframe based on the network-signaled parameters and estimated path loss or path gain. The latter part is governed primarily by the transmit power control commands sent in each subframe (i.e. active subframe where transmission takes place) to the D2D enabled node or UE by the network. This means the D2D enabled node or UE transmits its power based on both open loop estimation and TPC commands. Such power control approach applies for PUSCH, PUCCH and SRS. The uplink transmitted power for RACH (Random Access CHannel) transmission is only based on the open loop component, which may include, e.g., path loss and network signaled parameters.

In general, the UL power control in E-UTRAN as an example for cellular operation environment may be described as $$P_{X,c}(i) = \min\{P_{CMAX,c}(i), F(\gamma_1, \gamma_2, \gamma_3, \ldots)\},$$

where $P_{X,c}(i)$ is the UL transmit power on channel/signal X in serving cell C in subframe i of the UE or D2D enabled node, $P_{CMAX,c}(i)$ is the configured UE transmit power in subframe i for serving cell c, and $F(\gamma_2, \gamma_2, \gamma_3, \ldots)$ is a function of multiple parameters which are specific for the channel/signal X, e.g., PUSCH, PUCCH, SRS, PRACH. The UL power control schemes for specific channels/signals are described in more detail below.

Power control for UL shared channel is discussed in the following.

Some of the UL power control parameters for PUSCH depend also on index j, where
- j=0 indicates PUSCH (re)transmissions corresponding to a semi-persistent grant,
- j=1 indicates PUSCH (re)transmissions corresponding to a dynamically scheduled grant,
- j=2 indicates PUSCH (re)transmissions corresponding to the random access response grant.

The set of UL power control parameters for PUSCH comprises the parameters listed below.

$M_{PUSCH,c}(i)$, the bandwidth of the PUSCH resource assignment expressed in number of resource blocks valid for subframe i and serving cell c;

$P_{O\_PUSCH,c}(j)$, the parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower($P_{O\_PRE}$) and $\Delta_{PREAMBLE\_Msg3}$ are signalled from higher layers;

$\alpha_c(j)$, the parameter in [0, 1.0] for fractional path loss compensation provided by higher layers for j=0,1; the parameter is set to 1.0 for j=2;

$PL_c$=referenceSignalPower—higher layer filtered RSRP, the DL path loss estimate calculated in the UE/D2D enabled node for serving cell c in dB, where referenceSignalPower is provided by higher layers, RSRP is defined for the reference serving cell, and the higher layer filter configuration is defined for the reference serving cell;

$\delta_{PUSCH,c}$ is a correction value, also referred to as a transmit power control (TPC) command and is included in PDCCH; the current PUSCH power control adjustment state for serving cell c is given by $f_c(i)$ which is defined by:

$$f_c(i) = f_c(i-1) + \delta_{PUSCH,c}(i-K_{PUSCH})$$

if accumulation is enabled, or $$f_c(i) = \delta_{PUSCH,c}(i - K_{PUSCH})$$

if accumulation is not enabled, where $\delta_{PUSCH,c}(i-K_{PUSCH})$ was signalled on PDCCH on subframe $i-K_{PUSCH}$, and $K_{PUSCH}$ is as defined in by the standard ($K_{PUSCH}=4$ for FDD).

Transmit power configuration is now described in some detail.

There may be considered transmit power configuration per serving cell as follows.

The UE is allowed to set its configured maximum output power $P_{CMAX,c}$ for serving cell c. The configured maximum output power $P_{CMAX,c}$ is set within the following bounds:

$$P_{CMAX\_L,c} \leq P_{CMAX,c} \leq P_{CMAX\_H,c}, \text{ where}$$

$$P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c} + \Delta T_{C,c}, P\text{-}MPR_c)\},$$

$$P_{CMAX\_H,c} = \text{MIN}\{P_{EMAX,c}, P_{PowerClass}\}$$

where
- $P_{EMAX,c}$ is the value given by IE P-Max (signalled via RRC in SIB1, SIB3, SIB5 and in RRC configuration message for HO) for serving cell c, defined in 36.331;
- $P_{PowerClass}$ is the maximum UE power specified per UE class without taking into account tolerance;
- $MPR_c$ and $A\text{-}MPR_c$ are allowed maximum power reduction and allowed additional maximum power reduction, respectively;
- $\Delta T_{IB,c}$, $\Delta T_{C,c}$ are tolerance values for serving cell c.

There may be considered transmit power configuration for CA as follows. The total configured maximum output power PCMAX for CA (carrier aggregate) shall be set within the following bounds:

$$P_{CMAX\_L} \leq P_{CMAX} \leq P_{CMAX\_H}$$

For uplink inter-band CA with one serving cell c per operating band:

$$P_{CMAX\_L} = \text{MIN}\{10 \log_{10} \Sigma \text{MIN}[p_{EMAX,c}/(\Delta t_{C,c}), p_{PowerClass}/(\text{mpr}_c \cdot a\text{-mpr}_c \cdot \Delta t_{C,c} \cdot \Delta t_{IB,c}), p_{PowerClass}/\text{pmpr}_c], P_{PowerClass}\},$$

$$P_{CMAX\_H} = \text{MIN}\{10 \log_{10} \Sigma p_{EMAX,c}, P_{PowerClass}\},$$

where
- $p_{EMAX,c}$ is the linear value of $P_{EMAX,c}$ which is given by IE P-Max for serving cell c in 36.331;
- $P_{PowerClass}$ is the maximum power for a D2D enabled node or UE per (UE) class without taking into account tolerance; $p_{PowerClass}$ is the linear value of $P_{PowerClass}$;
- $\text{mpr}_c$ and $a\text{-mpr}_c$ are the linear values of $MPR_c$ and $A\text{-}MPR_c$;
- $\text{pmpr}_c$ is the linear value of $P\text{-}MPR_c$;
- $\Delta t_{C,c}$, $\Delta t_{IB,c}$ are the linear values of $\Delta T_{C,c}$ and $\Delta T_{IB,c}$ of the serving cell c.

For uplink intra-band contiguous CA, $$P_{CMAX\_L} = \text{MIN}\{10 \log_{10} \Sigma p_{EMAX,c} - \Delta T_C, P_{PowerClass} - \text{MAX}(MPR + A\text{-}MPR + \Delta T_{IB,c} + \Delta T_C, P\text{-}MPR)\},$$

$$P_{CMAX\_H} = \text{MIN}\{10 \log_{10} \Sigma p_{EMAX,c}, P_{PowerClass}\},$$

where
- P-MPR is the power management term for the D2D enabled node or UE;
- $\Delta T_C$ is the highest value $\Delta T_{C,c}$ among all serving cells c in the subframe over both timeslots.

Power reductions may be considered as follows. The allowed Maximum Power Reduction (MPR) for the maximum output power due to higher order modulation and for certain transmit bandwidth configuration (resource blocks) is specified in TS 36.101.

Additional, ACLR and spectrum emission requirements can be signalled by the network to indicate that the UE/D2D enabled node shall also meet additional requirements in a specific deployment scenario. To meet these additional requirements, Additional Maximum Power Reduction (A-MPR) is allowed for the output power of the UE/D2D enabled node. Unless stated otherwise, an A-MPR of 0 dB shall be used. RRC IE (information element), that directly relate to A-MPR (from TS 36.101) is called additionalSpectrumEmission signalled in SIB2 and in RRCConnectionReconfiguration (power setting for the target cell at HO as a part of MobilityControlInfo, used for the purpose of Handover Command).

Power Management Maximum Power Reduction (P-MPRc) is the allowed maximum output power reduction for a) ensuring compliance with applicable electromagnetic energy absorption requirements and addressing unwanted emissions/self defense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

Power control for D2D may be considered as follows. Open loop power control mechanism for D2D may be used for in-coverage (i.e. if covered by a cell of a cellular network) D2D enabled nodes or UEs for discovery (Type 1 and Type 2) and Mode 2 (non-UE specific configuration) communication and different PC parameters (P0 and alpha) may be used for discovery Type 1, discovery Type 2, and communication, wherein the parameters may be signaled by higher layers of the network.

For communication Mode 1, the PUSCH UL PC approach may be baseline, i.e., based on eNB-to-UE pathloss or, more general, on pathloss between network node and D2D enabled node. The PC parameters (P0 and alpha), signaled by a network node like an eNodeB, may, however, be different from those for PUSCH.

However, this approach may lead to:

A large difference in the power spectral density between D2D and cellular transmissions on the same carrier frequency (but different subframes), which may degrade the performance of the D2D enabled node or UE but may also impact the performance of other D2D enabled nodes or UEs, e.g., due to a lower accuracy of the power control, which may also result in higher unwanted emissions which may degrade performance in co-existence scenarios.

A large difference in the total per-carrier power with D2D on one carrier frequency and cellular UL on another carrier frequency may degrade the performance.

High D2D transmit power may interfere with cellular UL.

To deal with such issues, there are suggested

Power control rules for D2D

Methods in a D2D enabled node or UE for complying with the power control rules

Methods in a network node for complying with the power control rules

Methods for power control for D2D, in particular power control rules, are described in the following.

In the following, the conditions may refer to parameters and/or values and/or differences and/or limits of and/or for the same D2D enabled node or UE. A configuration of transmit power and/or a control of the transmit power may refer to the D2D enabled node or UE being adapted to transmit D2D transmission or signals or data with the configured or controlled transmit power and/or within limits provided by the configuration or the rules and/or conditions it is based upon. A corresponding control may e.g. influence and/or set a corresponding power on a transmitter of the D2D enabled node or UE.

According to one variant, the D2D transmit power or power density (the power or power density of D2D transmissions) of a D2D enabled node or UE may be configured e.g., by the D2D enabled node or UE and/or a D2D enabled node or UE may be configured to control its D2D transmit power based on one or more of the following rules:

The difference between the transmit power spectral density p_d2d for D2D in subframe i and the transmit power spectral density p_cellular for cellular UL transmission in subframe k on the same carrier frequency shall not exceed a first threshold f($\Delta1$) (subframes i and k may be adjacent or close in time subframes, and i>k or i<k, depending on whether the impact on D2D or cellular, respectively, is concerned):

$$abs(p\_d2d-p\_cellular)<=f1(\Delta1),$$

where in the simplest case f1 ($\Delta1$)=$\Delta1$.

A large difference may occur, e.g., due to:
large difference in power control parameters (e.g., P0) values for cellular UL and D2D,
different frequency of TPC commands for D2D and UL, resulting in that the power is adjusted at different pace for D2D and cellular UL.
D2D TPC does not follow cellular TPC when it comes how and how much the transmit power is adjusted.
Different PC steps for P_D2D and P_UL (which is realistic since the D2D link quality depends also on speed of the other UE, etc.).
Different QoS on different frequencies (e.g., requirements may be different on a public safety carrier and a carrier used for commercial purpose).
Different QoS requirements for D2D and cellular UL.

The difference between the total D2D transmit power P_d2d on carrier frequency f1 and the total UL cellular transmit power in the same or overlapping subframe on the same carrier frequency f1 (in one embodiment) or on another carrier frequency f2 (in another embodiment) shall not exceed a second threshold f2($\Delta2$):

$$abs(P\_d2d-P\_cellular)<=f2(\Delta2),$$

where in the simplest case f2($\Delta2$)=$\Delta2$.

A large difference may occur, e.g., due to:
large difference in power control parameters (e.g., P0) values for cellular UL and D2D,
different frequency of TPC commands for D2D and UL, resulting in that the power ic adjusted at different pace for D2D and cellular UL.
D2D TPC does not follow cellular TPC when it comes how and how much the transmit power is adjusted.
Different PC steps for P_D2D and P_UL (which is realistic since the D2D link quality depends also on speed of the other UE, etc.).
Different interference conditions on different frequencies (for which PC aims to compensate for).
Different QoS on different frequencies (e.g., requirements may be different on a public safety carrier and a carrier used for commercial purpose).
Different QoS requirements for D2D and cellular UL.

The absolute D2D transmit power P_d2d may be limited by f3($\Delta3$) (there may or may not be other transmissions by the same UE on the same or on another carrier frequency):

$$P\_d2d<=f3(\Delta3),$$

where f3($\Delta3$) is a function of $\Delta3$, and $\Delta3$ may be, e.g., a power back-off parameter (e.g., a D2D-specific power reduction value) or a maximum D2D transmit power; for example, f3($\Delta3$)=$\Delta3$ (e.g., $\Delta3$ is the maximum transmit power for D2D) or f3($\Delta3$)=Pmax,c-$\Delta3$ (i.e., $\Delta3$>=0 may be a back-off factor per carrier c).

The D2D transmit power spectral density p_d2d may be limited by f4($\Delta4$) (there may or may not be other transmissions by the same UE on the same or on another carrier frequency):

$$p\_d2d<=f4(\Delta4),$$

where f4($\Delta4$) is a function of $\Delta4$, and $\Delta4$ may be, e.g., a power back-off parameter (e.g., a D2D-specific power reduction value for D2D power spectral density) or a maximum D2D transmit power spectral density; for example, f4($\Delta4$)=$\Delta4$ (e.g., $\Delta4$ is the maximum transmit power spectral density for D2D) or f4($\Delta4$)=p_cellular_max,c-$\Delta4$ (i.e., $\Delta4$>=0 may be a back-off factor per carrier c).

The transmit power and/or transmit power density for D2D shall not exceed the transmit power for cellular UL transmission (e.g., PUSCH or SRS) on the same carrier plus an offset, e.g., to control interference to cellular UL at the serving eNodeB:

$$p\_d2d<=p\_cellular+f5(\Delta5)$$

and/or $$P\_d2d<=P\_cellular+f6(\Delta6),$$

where f5($\Delta5$) and f6($\Delta6$) may be negative, zero or positive, and in the simplest case f5($\Delta5$)=$\Delta5$ and f6($\Delta6$)=$\Delta6$; for example, f6($\Delta6$)=1 dB may mean that the D2D transmit power is not allowed to exceed the cellular UL power by more than 1 dB.

In addition to the above rules, also the total power over all carriers for D2D and cellular UL may be constrained to not exceed at least the maximum supported UE power. In one example, it shall not exceed a certain maximum power (Pmax-$\Delta0$) per UE, where $\Delta0$>=0 may be a correction factor such as a power back off.

In the power control rules described above, functions fn($\Delta$n) and/or parameters $\Delta$n (n=0, 1, 2, . . . ) may be pre-defined, autonomously decided by the UE or configurable (e.g., by higher layers, an application, or signaled by another node such as a network node which may also be eNodeB or ProSe server, e.g., by broadcast/multicast/unicast, via radio interface or fixed interface, via higher-layer protocols or physical-layer signaling).

In one specific variant, the parameters $\Delta$n (n=0, 1, 2, . . . ), which are back-off factors for D2D (D2D power reduction parameters) in different rules, may be added and signaled via existing signaling for MPR values. However, then when implementing power control, the UE should combine some D2D-specific power control parameters (e.g., P0, alpha, etc.) and PC parameters configured for cellular UL (e.g., back off factors), if they are configured. Thus, in yet another embodiment, the configuring of the D2D enabled node or UE with some cellular UL PC parameters (used in such combination) may be triggered by the fact that D2D PC is configured and will be configured for the same D2D enabled node or UE.

In another example, new signaling means may be specified for signaling D2D-specific back-off factors, which may (e.g., in some network implementations) or may not (in other implementations) be the same as the corresponding/similar back off factors for cellular UL on the same carrier. The D2D-specific back-off factors may be defined to account also for the potential interference to receivers in the UL spectrum. For D2D enabled nodes or UEs that are out of cellular network coverage, D2D-specific factors may be derived by the D2D enabled node or UE based on a pre-defined rule or may be pre-defined by the standard or may be pre-configured in the D2D enabled node or UE.

Conditions and triggers for the power control rules are described in the following.

In one embodiment, the power control rules described above may apply not always but in specific conditions, e.g., it may be based on any one or any one combination of:

- A coverage condition, e.g. pertaining to if or whether D2D enabled node or UE is within cellular network coverage (e.g., UE receives cellular network radio signals [e.g., reference signals such as CRS or synchronization signals such as PSS/SSS] whose strength is above a threshold; UE is in RRC_CONNECTED or in RRC_IDLE),
- An activity state, e.g. pertaining to if or whether the D2D enabled node or UE is in a certain activity state and/or in which activity state it is (e.g., different parameter values may apply for RRC_IDLE and RRC_CONNECTED, DRX and non-DRX)
- A location, e.g. pertaining to if or whether the D2D enabled node or UE is in a certain location associated with specific propagation conditions and/or at which location or type of location it is (e.g., indoors or outdoors or between high buildings),
- A node proximity, e.g. pertaining to if or whether the D2D enabled node or UE is close to a victim node and/or how close it is (a victim node may be a network node and/or a base station, another node not enabled for D2D, or another D2D enabled node or UE which may be transmitting and/or receiving in the UL spectrum and/or carrier and/or that may potentially suffer from its interference),
- A transmission frequency condition, e.g. pertaining to if or whether the D2D enabled node or UE is transmitting in a specific frequency band and/or on a specific frequency and/or at which frequency band and/or frequency and/or carrier it is transmitting, where the D2D enabled node or UE may be capable of transmitting for D2D, configured for D2D transmissions, or authorized for D2D transmissions
- A transmission carrier condition, e.g. pertaining to if or whether D2D enabled node or UE is transmitting in a specific frequency band and/or on a specific frequency and/or at which frequency band and/or frequency and/or carrier it is transmitting, where it is capable of CA (different parameter values may apply for CA-capable and non-CA capable UEs)
- A carrier aggregation condition, e.g. pertaining to if or whether the D2D enabled node or UE is in CA and/or in which CA state it is (different parameter values may apply for non-CA and CA cases)
- An operation coincidence condition, e.g. pertaining to if or whether the D2D enabled node or UE is operating simultaneously in D2D and cellular UL on different carriers and/or cellular operation and D2D operation of the D2D enabled node or UE on different carriers coincide;
- An edge condition, e.g. pertaining to if or whether the D2D enabled node or UE is transmitting close to or at the edge of the frequency band edge, which may result in a higher probability of high unwanted emissions if the UE is transmitting at a higher power
- A cell condition, e.g. pertaining to whether or if the D2D enabled node or UE is in a certain part of the cell, e.g., cell edge or cell center, and/or the location of the D2D enabled node or UE within the cell (e.g., a higher power may be allowed at the cell edge than in the cell center).

The functions $fn(\Delta n)$ and/or parameter values of $\Delta n$ ($n=0, 1, 2, \ldots$) may also depend on the conditions above.

Generally, the D2D enabled node or UE may be adapted to control, and/or control, and/or the D2D enabled node or UE's transmit power, in particular the D2D transmit power, may be controlled, based on one or more different conditions, e.g. a difference between the transmit power spectral density and/or a difference between the total D2D transmit power P_d2d on a carrier frequency f1 and the total UL cellular transmit power and/or a limit of the absolute D2D transmit power P_d2d and/or a limit on the D2D transmit power spectral density p_d2d and/or such that the transmit power density for D2D does not exceed the transmit power for cellular UL transmission and/or taking into account the functions $fn(\Delta n)$ and/or parameter values of $\Delta n$ and/or any other condition outlined above. The power may be controlled or controllable based on any one or any combination of these conditions and/or functions. A D2D device may comprise a D2D power control module for controlling D2D transmit power as outlined herein. Methods of meeting the power control rules are described in the following.

The functions $fn(\Delta n)$ and/or parameters $\Delta n$ ($n=0, 1, 2, \ldots$) may be decided to control one or more of the below and/or meet the corresponding requirements, e.g., any of:
  power control accuracy for D2D and/or cellular UL,
  co-existence aspects (e.g., unwanted emissions),
  maximum co-channel interference,
  maximum inter-subcarrier leakage.

Configuring and adapting or controlling D2D power is described in the following.

According to one variant, a method in and/or performed by a D2D enabled node or UE may implement or perform one or any suitable combination of steps as follows. There is also disclosed a D2D enabled node or UE adapted to perform such one or any suitable combination of such steps:

Step 1: Obtaining at least one D2D power-control related parameter $\Delta n$ (n=0, 1, 2, etc., e.g.: $\Delta 0, \Delta 1, \Delta 2, \ldots$) described above, wherein the obtaining may comprise, e.g., any one or more of: using a pre-defined/pre-configured value, reading from internal or external memory, calculating based on a pre-defined rule, determining based on D2D enabled node or UE location, determining based on radio measurements in the DL and/or UL spectrum performed by the network node and/or by the D2D enabled node or UE (e.g., MDT measurements, radio signal strength or quality measurements, interference measurements), obtained by table or by mapping of one or more measurements to the parameter value, receiving from a higher layer, or receiving from another node (e.g., network node or another D2D enabled node or UE) via broadcast/multicast/unicast. A D2D device may comprise a Parameter obtaining module for obtaining at least one D2D power-control related parameter, wherein the obtaining may be performed or performable e.g. as outlined herein.

Step 2: Applying function fn(Δn), to control the total D2D transmit power or D2D transmit power density, based on at least one of the power control rules described above. A D2D device may comprise a power rules control module for controlling the total D2D transmit power or D2D transmit power density, wherein the controlling may be performed or performable e.g. as outlined herein.

Step 3: Determining the D2D transmit power configuration, meeting the at least one rule, wherein the D2D transmit power configuration may be any of: total D2D transmit power per carrier, total D2D power over more than one carrier, D2D transmit power spectral density, etc. A D2D device may comprise a D2D transmit power configuration module for determining the D2D transmit power configuration, wherein the determining may be performed or performable e.g. as outlined herein.

Step 3a (optional): Adapting and/or configuring and/or controlling the D2D transmit configuration, so that the D2D transmit power configuration meets the at least one of the power control rules described above.

Some examples of D2D transmit configuration parameters are: bandwidth or number of resource blocks, frequency hopping configuration, frequency position of the to-be-transmitted signal/channel with respect to the band edge since a higher power may be allowed closer to the center but not at the edge, PC parameters (e.g., P0, alpha, etc.), etc.

A D2D device may comprise a D2D configuration module for adapting and/or configuring and/or controlling the D2D transmit configuration, wherein the adapting and/or configuring and/or controlling may be performed or performable as outlined herein.

Step 4: Using the determined/adapted parameter or configuration to configure the transmit power for at least one D2D signal or channel. A D2D device may comprise a D2D application module for using the determined/adapted parameter or configuration, wherein the using may be performed or performable as outlined herein.

Step 5 (optional): Signaling the determined/adapted parameter or configuration to another node (e.g., network node, eNodeB, D2D server, or another D2D enabled node or UE). A D2D device may comprise a D2D signaling module for signaling the parameter or configuration, wherein the signaling may be performed or performable as outlined herein.

Generally, the D2D enabled node or UE may be adapted to control and/or control its D2D transmit power based on one or more parameters and/or functions, in particular one or more parameters or functions according to Steps 1 to 5). A D2D device may comprise a D2D control module for controlling the D2D transmit power according to one of the methods as outlined herein, wherein the control module may comprise one or more of the above-mentioned modules and/or may be separate of one or more of the above-mentioned modules.

Configuring and adapting cellular UL power for the UE operating D2D or for the UE operating D2D and cellular UL is described in the following. According to this approach, similar steps to the above may be implemented in the D2D enabled node or UE, wherein to meet the rules the D2D enabled node or UE may configure and/or adapt and/or may be adapted to control or adapt or configure at least one cellular UL PC parameter.

Step 0: Determining and obtaining at least one cellular UL power control that impacts the total transmit cellular UL power or power density for cellular UL used in the rules described above, wherein the obtaining may comprise, e.g., any one or more of: using a pre-defined/pre-configured value, reading from internal or external memory, calculating based on a pre-defined rule, determining based on D2D enabled node or UE location, determining based on radio measurements in the DL and/or UL spectrum performed by the network node and/or by the D2D enabled node or UE (e.g., MDT measurements, radio signal strength or quality measurements, interference measurements), obtained by table or by mapping of one or more measurements to the parameter value, receiving from a higher layer, or receiving from another node (e.g., network node or another UE) via broadcast/multicast/unicast. A D2D device may comprise a UL power control obtaining module for determining and obtaining at least one UL power control, wherein the determining and obtaining may be performed or performable e.g. as outlined herein.

Step 1: Obtaining at least one D2D power-control related parameter Δn (n=0, 1, 2, etc., e.g.: Δ0, Δ1, Δ2, . . . ) described above. A D2D device may comprise a UL D2D parameter obtaining module for obtaining at least one D2D power-control related parameter, wherein the obtaining may be performed or performable e.g. as outlined herein. The UL D2D parameter obtaining module may be the Parameter obtaining module mentioned above and/or interface with and/or communicate with and/or receive from and/or request from such Parameter obtaining module the at least one parameter to be obtained for obtaining the parameter.

Step 2: Applying function fn(Δn), to control the total D2D transmit power or D2D transmit power density, based on at least one of the power control rules described above. A D2D device may comprise an additional power rules control module for controlling the total D2D transmit power or D2D transmit power density, wherein the controlling may be performed or performable e.g. as outlined herein. Alternatively, the power rules control module may be used for such and/or the additional power rules control module may interface with and/or communicate with and/or request from the power rules control module to perform the controlling.

Step 3: Determining the cellular UL transmit power configuration, meeting the at least one rule, wherein the cellular UL transmit power configuration may be any of: total cellular UL transmit power per carrier, total cellular UL power over more than one carrier, cellular UL transmit power spectral density, etc. A D2D device may comprise a UL power configuration module for determining cellular UL transmit power configuration, wherein the determining may be performed or performable e.g. as outlined herein.

Step 3a (optional): Adapting the cellular UL transmit power configuration, so that the configuration meets the at least one of the power control rules described above.

Some examples of cellular UL transmit configuration parameters: bandwidth or number of resource blocks, frequency hopping configuration, frequency position of the to-be-transmitted signal/channel with respect to the band edge since a higher power may be allowed closer to the center but not at the edge, PC parameters (e.g., P0, alpha, etc.), etc. A D2D device may comprise a UL transmit power configuration module for adapting the cellular UL transmit power configuration, wherein the adapting may be performed or performable e.g. as outlined herein.

Step 4: Using the determined/adapted parameter or configuration to configure the transmit power for at least one cellular UL signal or channel. A D2D device may comprise an UL application module for using the determined/adapted parameter or configuration, wherein the using may be performed or performable e.g. as outlined herein.

Step 5 (optional): Signaling the determined/adapted parameter or configuration to another node (e.g., network node, eNodeB, D2D server, or another D2D enabled node or UE). A D2D device may comprise a UL signaling module for signaling the determined/adapted parameter or configuration, wherein the signaling may be performed or performable e.g. as outlined herein. Alternatively, the D2D signaling module may be used for such and/or the UL signaling module may interface with and/or communicate with and/or request the D2D signaling module to perform the signaling.

Generally, the D2D enabled node or UE may be adapted and/or may control the UL power, which may be in addition to controlling the D2D transmit power as outlined above. A D2D device may comprise a UL control module for performing control of the UL power according to one of the methods outlined herein, which may include any one or more of the modules discussed herein and/or may be separate from the D2D control module and/or integrated therein (fully or at least partly).

Configuring and adapting jointly D2D power and cellular UL power for the UE operating D2D and cellular UL is described in the following. According to this part of the disclosure, similar steps to the above may be implemented in the UE, wherein to meet the rules the UE configures and/or adapts at least one cellular UL PC parameter and at least one D2D PC parameter.

Step 0: Determining and obtaining at least one cellular UL power control parameter and at least one D2D power control parameter that impact the total transmit cellular UL power or power density for cellular UL and D2D, respectively, used in the rules described above, wherein the obtaining may comprise, e.g., any one or more of: using a pre-defined/pre-configured value, reading from internal or external memory, calculating based on a pre-defined rule, determining based on UE location, determining based on radio measurements in the DL and/or UL spectrum performed by the network node and/or by the UE (e.g., MDT measurements, radio signal strength or quality measurements, interference measurements), obtained by table or by mapping of one or more measurements to the parameter value, receiving from a higher layer, or receiving from another node (e.g., network node or another UE) via broadcast/multicast/unicast. A D2D device may comprise a common determining module for determining and obtaining at least one cellular UL power control parameter and at least one D2D power control parameter, wherein the determining and obtaining may be performed or performable e.g. as outlined herein.

Step 1: Obtaining at least one parameter $\Delta n$ (n=0, 1, 2, etc., e.g.: $\Delta 0$, $\Delta 1$, $\Delta 2$, . . . ) described above. A D2D device may comprise a common obtaining module for obtaining at least one parameter, wherein the obtaining may be performed or performable e.g. as outlined herein. The common obtaining module may be the Parameter obtaining module or UL parameter obtaining module mentioned above and/or interface with and/or communicate with and/or receive from and/or request from such obtaining module the at least one parameter to be obtained for obtaining the parameter.

Step 2: Applying function $fn(\Delta n)$, to control at least one of the total D2D transmit power and D2D transmit power density) and at least one of the total cellular UL transmit power and cellular UL transmit power density, based on at least one of the power control rules described above. A D2D device may comprise a common power rules control module for controlling at least one of the total D2D transmit power and D2D transmit power density) and at least one of the total cellular UL transmit power and cellular UL transmit power density, wherein the controlling may be performed or performable e.g. as outlined herein. Alternatively, the power rules control module or additional power rules control module may be used for such and/or the common power rules control module may interface with and/or communicate with and/or request one of these rules control modules to perform the controlling.

Step 3: Determining the cellular UL transmit power configuration and D2D transmit power configuration, meeting the at least one rule, wherein a transmit power configuration may be any of: total transmit power per carrier (cellular or D2D), total power over more than one carriers (cellular or D2D or both), transmit power spectral density (cellular or D2D), etc. A D2D device may comprise a common power configuration module for determining cellular UL transmit power configuration and D2D transmit power configuration, wherein the determining may be performed or performable e.g. as outlined herein. The common power configuration module may comprise the D2D power configuration module and/or the UL power configuration module and/or interface with and/or communicate with and/or request one or both of them to perform the determining.

Step 3a (optional): Adapting at least one of the cellular UL transmit configuration and D2D transmit configuration, so that the configuration meets the at least one of the power control rules described above.

Some examples of a transmit configuration parameters: bandwidth or number of resource blocks, frequency hopping configuration, frequency position of the to-be-transmitted signal/channel with respect to the band edge since a higher power may be allowed closer to the center but not at the edge, PC parameters (e.g., P0, alpha, etc.), etc.

A D2D device may comprise a common transmit power configuration module for adapting the cellular UL transmit power configuration and D2D transmit configuration, wherein the adapting may be performed or performable e.g. as outlined herein. The common transmit power configuration module may comprise the D2D transmit power configuration module and/or the UL transmit power configuration module and/or interface with and/or communicate with and/or request one or both of them to perform the determining.

Step 4: Using the determined/adapted parameter or configuration to configure the transmit power for at least one cellular UL signal or channel and at least one D2D signal or channel. A D2D device may comprise a common application module for using the determined/adapted parameter or configuration, wherein the using may be performed or performable e.g. as outlined herein. The common application module may comprise the D2D application module and/or the UL application module and/or interface with and/or communicate with and/or request one or both of them to perform the using.

Step 5 (optional): signaling the determined/adapted parameter or configuration to another node (e.g., eNodeB, D2D server, or another UE). A D2D device may comprise a common signaling module for signaling the determined/adapted parameter or configuration, wherein the signaling may be performed or performable e.g. as outlined herein. Alternatively, the D2D or UL signaling modules may be used for such and/or the common signaling module may interface with and/or communicate with and/or request one or both of these signaling modules to perform the signaling.

Generally, the D2D enabled node or UE may be adapted and/or may control the UL power and the D2D power, which may be in addition to controlling the D2D transmit power and/or the UL transmit power as outlined above. A D2D device may comprise a common control module for performing control of the UL and D2D power according to one of the methods outlined herein, which may include any one or more of the modules discussed herein and/or may be separate from the D2D and/or UL control module and/or integrate either of them (fully or at least partly).

Methods in a network node are described in the following. According to one variant, a network node (e.g., eNodeB or ProSe server or allocation node or base station) may implement the any one or any combination of the following steps or be adapted to perform any one or any combination of the following steps:

Step 1: Obtaining at least one D2D power-control related parameter Δn described above, wherein the obtaining may comprise, e.g., any one or more of: using a pre-defined/pre-configured value, reading from internal or external memory, calculating based on a pre-defined rule, determining based on D2D enabled node or UE location, determining based on radio measurements in the DL and/or UL spectrum performed by the network node and/or by the D2D enabled node or UE (e.g., MDT measurements, radio signal strength or quality measurements, interference measurements), obtained by table or by mapping of one or more measurements to the parameter value, or receiving from another node (e.g., O&M, SON, etc.). A network device may comprise a NW obtaining module for obtaining at least one parameter, wherein the determining may be performed or performable e.g. as outlined herein.

Step 1a (optional): Adapting the D2D transmit configuration for at least one D2D enabled node or UE, together with determining the D2D transmit power configuration, so that the D2D transmit power configuration meets the at least one of the power control rules described above.

Some examples of D2D transmit configuration parameters: bandwidth or number of resource blocks, frequency hopping configuration, frequency position of the to-be-transmitted signal/channel with respect to the band edge since a higher power may be allowed closer to the center but not at the edge, time-domain and/or frequency-domain pattern configuration for D2D, D2D resource pool configuration, D2D power control parameters, etc.

A network device may comprise a NW adaption module for adapting the D2D transmit configuration for at least one D2D enabled node or UE, wherein the adapting may be performed or performable e.g. as outlined herein.

Step 2: Signaling one or more of the obtained D2D power-control related parameter Δn to another node (e.g., to the UE or another eNodeB) via broadcast/multicast/unicast, via its radio interface (e.g., via higher-layer protocol such as RRC for dedicated or multicast/broadcast information such as system information, or via lower-layer signaling such as a physical control channel or physical multicast/broadcast channel) or via fixed interface (e.g., X2).

A network device may comprise a NW signaling module for signaling one or more of the obtained D2D power-control related parameter, wherein the signaling may be performed or performable e.g. as outlined herein.

Step 2a (optional): Signaling of the adapted D2D transmit configuration to another network node or to the D2D enabled node or UE (the D2D enabled node or UE may then use the received configured/adapted configuration/parameter to configure its transmission). In one example, the signaling is together with the obtained D2D power-control related parameter.

A network device may comprise a NW configuration signaling module for signaling the adapted D2D transmit configuration to another network node or to the D2D enabled node or UE, wherein the signaling may be performed or performable e.g. as outlined herein.

Similar to D2D enabled node or UE embodiments, the network node, in one embodiment, may configure and/or adapt at least one cellular UL transmit configuration or parameter to meet one or more of the rules described herein. The configured/adapted configuration or parameter may be signaled to another network node or to the D2D enabled node or UE. The D2D enabled node or UE may then use the received configured/adapted configuration/parameter to configure its transmission. The other network node may use the received configuration/parameter e.g. for one or more operation tasks (e.g., RRM, interference coordination, power control of own D2D enabled node or UEs, storing and later using for statistics or history, etc.).

Similar to D2D enabled node or UE embodiments, the network node, in another embodiment, may configure and/or adapt at least one cellular UL transmit configuration or parameter and at least one D2D transmit configuration or parameter to meet one or more of the rules described herein. The configured/adapted configuration(s) or parameter(s) may be signaled to another network node or to the D2D enabled or UE.

The D2D enabled node or UE may then use the received configured/adapted configuration/parameter to configure its transmission. The other network node may use the received configuration/parameter e.g. for one or more operation tasks (e.g., RRM, interference coordination, power control of own D2D enabled node or UEs, storing and later using for statistics or history, etc.). A corresponding network device may comprise corresponding modules to perform the individual steps, analogous to the D2D device, wherein the modules may be aimed at providing steps for controlling UL power and/or UL and D2D power.

There is generally disclosed a method for operating a D2D enabled node, in particular in a wireless communication network, comprising controlling the D2D transmit power and/or the UL transmit power of the D2D enabled node. The D2D enabled node may be performing a D2D operation and/or be in D2D communication. The controlling may be performed based upon at least one D2D power-related parameter or D2D power control parameter. The method may comprise any of the steps or methods or corresponding features disclosed in the context of a D2D enabled node.

There is also generally disclosed a method for operating a network node, in particular in a wireless communication network, comprising determining a D2D transmit power configuration and/or a UL transmit power configuration based on at least one D2D power-related parameter or D2D power control parameter and/or determining at least one D2D power-related parameter or D2D power control parameter. The method may comprise signalling the determined configuration/s and/or the at least one parameter to a D2D enabled node or UE. The method may comprise any of the steps or methods or corresponding features disclosed in the context of a network node.

In the alternative to the above, there are described approaches regarding power control, in particular commanding power control.

An open loop power control mechanism may be used for in-coverage D2D enabled node or UEs for discovery (Type 1 and Type 2) and Mode 2 (non-D2D enabled node or UE specific configuration) communication and different PC parameters (P0 and alpha) may be used for discovery Type 1, discovery Type 2, and communication, the parameters being signaled by higher layers.

For communication Mode 1, the current PUSCH UL PC approach is baseline, i.e., based on eNB-to-UE pathloss or more general pathloss between network node and D2D enabled node or UE. The PC parameters (P0 and alpha), signaled by a network node or eNodeB, may, however, be different from those for PUSCH.

A TPC command for D2D communication may be signaled in the ProSe resource grant transmitted by a network node or eNB via PDCCH or EPDCCH to a D2D enabled node or UE, the grant may be scrambled with a ProSe RNTI. TPC for D2D communication may apply to SA transmissions and/or D2D data.

Power control command (a.k.a. TPC) may be used for D2D communication, but remains largely undefined for this context. Further, the network may still be using TPCs cellular UL transmissions from the same D2D enabled node or UE.

There is no relation between controlling TPCs and in the TPC steps for D2D and cellular UL transmission, which may lead to large difference in the tx power and/or tx power spectral densities between D2D and cellular UL transmissions, which may then degrade performance of D2D and/or cellular UL.

There are no means to control TPC, when it is not needed.

TPCs for D2D and cellular UL transmissions are sent in different resource grants which may be transmitted with different frequency or periodicity in time (e.g., at least once in 10 ms for cellular UL and every 40 ms or every 160 ms for D2D), which may cause problems with how fast and/or accurate the power control adjustments are for D2D and cellular UL transmissions.

TPC for D2D communication may be defined for accumulated or absolute power control, it is not clear how and when to use which.

To overcome or ameliorate such issues, there are suggested

Methods, in and/or for operating a network node, for controlling TPC for D2D communication or transmissions and/or cellular UL for a D2D enabled node or UE operating D2D or performing D2D operations or transmission.

Methods in a D2D enabled node or UE for adapting TPC for D2D communication or transmissions and/or cellular UL transmission, when the D2D enabled node or UE is operating D2D or performing D2D operations or transmission.

Power control commands in TPC format or TPC may be used for controlling power and/or to cause a D2D enabled node or UE receiving at least one such command or TPC message to control power based on and/or according to the command or TPC. The command or TPC may be transmitted to the D2D enabled node from or via a network node, in particular a base station or eNB or allocating node.

Methods in a network node for controlling TPC for D2D communication and/or cellular UL for a D2D enabled node or UE operating in D2D are discussed in the following. According to this part, a network node (e.g., eNodeB or D2D server or allocation node) controls or may be adapted to control at least one of or any combination of:

TPC for D2D, and
cellular UL power control configuration or parameter, which may comprise one or more of: TPC for cellular UL, PC parameters such as P0, alpha, Pmax, power backoff or power compensation, wherein the control may be performed in order to meet one or more criteria for the D2D enabled node or UE's D2D operation. A network device may comprise a NW control module for controlling according to this.

In the above, controlling may comprise one or more of: configuring, reconfiguring, adapting the configuration, determining the configuration, adapting the configuration to meet one or more criteria, etc. The configuration generally may comprise parameters and/or parameter values and/or indications and/or instructions, which may be set and/or determined and/or updated by controlling.

The controlling may be static (e.g., determined by a pre-defined rule, configured statically in a network node, etc.), semi-static or dynamic.

When both are controlled, the controlling may be separate for TPC for D2D and TPC for cellular UL or joint based on mutual relation between the two.

The controlling may further comprise sending a result of the controlling, e.g., a controlled parameter or configuration to a D2D enabled node or UE (see also section 6.2.3) and/or to another network node. Such a node or UE may be adapted to perform power control, in particular for itself and/or one or more of its transmitters, for D2D and/or UL based on or according to the configuration. A network device may comprise a NW sending module for performing sending, which in one variant may be implemented as a sub-module of the NW control module or integrated in it.

The network node may also inform the D2D enabled node or UE or another network node that it has performed the controlling or that it is capable of performing the controlling. If the D2D enabled node or UE receives such indication, it may not need to perform a further adapting. A network device may comprise a NW informing module for informing according to this.

Criteria will be discussed in the following. Some examples of the criteria for controlling are (one or more may be used) are set out below. Controlling may be performed based on any one or any combination of such criteria or conditions:

The amount of power reduction for at least one D2D transmissions and at least one cellular UL transmission at once (at the same time or during the same or overlapping time intervals) may be the same or may not exceed a threshold, e.g. when applied simultaneously, during the same or overlapping or (any) different time intervals.

The total (accumulated) amount of power reduction for at least one D2D transmission and at least one cellular UL transmission may not exceed a threshold during a certain time period, during the same or overlapping or (any) different time intervals The maximum allowed power reduction for at least one D2D transmission and at least one cellular UL transmission at any time or during the same or overlapping time intervals may be the same or may not differ by more than a threshold The same power control type (e.g., absolute or accumulated) may be used for at least one D2D transmission and at least one cellular UL transmission when configured at the same time or during the same or overlapping time intervals Only one TPC command type (e.g., either TPCs for cellular UL or TPCs for D2D) may be used by the D2D enabled node or UE at the same time or during the same or overlapping time intervals Same power control type (e.g., absolute or accumulated for all D2D transmissions using power control) for all or a plurality of D2D transmission types (e.g., the same for SA and D2D data); a certain power control type may also be pre-defined for D2D (e.g., only one power control is used for D2D power control) or the power control type may be configurable and controlled such that all power-controlled D2D transmissions in the same session or occurring during the same or overlapping time intervals are using the same power control type.

The overhead of multiple TPCs may not exceed a certain limit, e.g., TPC of at least one of: the first type may not be more frequent than N1 times over a time period T1, and the second type may not be more frequent than N2 (e.g., N1=N2) times over a time period T2 (e.g., T1=T2).

Meeting some pre-defined or configurable (e.g., the thresholds are configured by the network node) rules, e.g.:

The difference between the transmit power spectral density p_d2d for D2D in subframe i and the transmit power spectral density p_cellular for cellular UL transmission in subframe k on the same carrier frequency shall not exceed a first threshold $f(\Delta 1)$ (subframes i and k may be adjacent or close in time subframes, and i>k or i<k, depending on whether the impact on D2D or cellular, respectively, is concerned):

$$abs(p\_d2d - p\_cellular) <= f1(\Delta 1),$$

where in the simplest case $f1(\Delta 1) = \Delta 1$.

A large difference may occur, e.g., due to:
large difference in power control parameters (e.g., P0) values for cellular UL and D2D;
different frequency of TPC commands for D2D and UL, resulting in that the power ic adjusted at different pace for D2D and cellular UL;
D2D TPC does not follow cellular TPC when it comes how and how much the transmit power is adjusted;
Different PC steps for P_D2D and P_UL (which is realistic since the D2D link quality depends also on speed of the other D2D enabled node or UE, etc.);
Different QoS on different frequencies (e.g., requirements may be different on a public safety carrier and a carrier used for commercial purpose);
Different QoS requirements for D2D and cellular UL;

The difference between the total D2D transmit power P_d2d on carrier frequency f1 and the total UL cellular transmit power in the same or overlapping subframe on the same carrier frequency f1 (in one embodiment) or on another carrier frequency f2 (in another embodiment) shall not exceed a second threshold $f2(\Delta 2)$:

$$abs(P\_d2d - P\_cellular) <= f2(\Delta 2),$$

where in the simplest case $f2(\Delta 2) = \Delta 2$.

A large difference may occur, e.g., due to:
large difference in power control parameters (e.g., P0) values for cellular UL and D2D,
different frequency of TPC commands for D2D and UL, resulting in that the power ic adjusted at different pace for D2D and cellular UL;
D2D TPC does not follow cellular TPC when it comes how and how much the transmit power is adjusted;
Different PC steps for P_D2D and P_UL (which is realistic since the D2D link quality depends also on speed of the other D2D enabled node or UE, etc.);
Different interference conditions on different frequencies (for which PC aims to compensate for);
Different QoS on different frequencies (e.g., requirements may be different on a public safety carrier and a carrier used for commercial purpose);
Different QoS requirements for D2D and cellular UL.

The absolute D2D transmit power P_d2d may be limited by $f3(\Delta 3)$ (there may or may not be other transmissions by the same D2D enabled node or UE on the same or on another carrier frequency):

$$P\_d2d <= f3(\Delta 3),$$

where $f3(\Delta 3)$ is a function of $\Delta 3$, and $\Delta 3$ may be, e.g., a power back-off parameter (e.g., a D2D-specific power reduction value) or a maximum D2D transmit power; for example, $f3(\Delta 3) = \Delta 3$ (e.g., $\Delta 3$ is the maximum transmit power for D2D) or $f3(\Delta 3) = Pmax,c - \Delta 3$ (i.e., $\Delta 3 >= 0$ may be a back-off factor per carrier c).

The D2D transmit power spectral density p_d2d may be limited by $f4(\Delta 4)$ (there may or may not be other transmissions by the same D2D enabled node or UE on the same or on another carrier frequency):

$$p\_d2d <= f4(\Delta 4),$$

where $f4(\Delta 4)$ is a function of $\Delta 4$, and $\Delta 4$ may be, e.g., a power back-off parameter (e.g., a D2D-specific power reduction value for D2D power spectral density) or a maximum D2D transmit power spectral density; for example, $f4(\Delta 4) = \Delta 4$ (e.g., $\Delta 4$ is the maximum transmit power spectral density for D2D) or $f4(\Delta 4) = p\_cellular\_max,c - \Delta 4$ (i.e., $\Delta 4 >= 0$ may be a back-off factor per carrier c).

The transmit power and/or transmit power density for D2D shall not exceed the transmit power for cellular UL transmission (e.g., PUSCH or SRS) on the same carrier plus an offset, e.g., to control interference to cellular UL at the serving eNodeB or network node:

$$p\_d2d <= p\_cellular + f5(\Delta 5)$$

and/or $$P\_d2d <= P\_cellular + f6(\Delta 6),$$

where $f5(\Delta 5)$ and $f6(\Delta 6)$ may be negative, zero or positive, and in the simplest case $f5(\Delta 5) = \Delta 5$ and $f6(\Delta 6) = \Delta 6$; for example, $f6(\Delta 6) = 1$ dB may mean that the D2D transmit power is not allowed to exceed the cellular UL power by more than 1 dB.

the total power over all carriers for D2D and cellular UL may be constrained to not exceed at least the maximum supported D2D enabled node or UE power. In one example, it shall not exceed a certain maximum power $(Pmax - \Delta 0)$ per D2D enabled node or UE, where $\Delta 0 >= 0$ may be a correction factor such as a power back off.

Controlling is discussed in more detail in the following. The controlling may be any one or more of: based on a pre-defined rule, implicit or explicit signaling to the D2D enabled node or UE of the controlled configuration/parameter, pre-configured, determined by one or more conditions (e.g., interference conditions, D2D enabled node or UE state, how close the is to the cell edge or to the eNB, specific D2D enabled node or UE location or area e.g. certain local area, indoor/outdoor, urban/rural, etc.).

Controlling TPC for D2D is discussed in the following. The controlling of TPC for D2D may comprise, e.g., any one or more of:

Turning on or turning off the TPC for at least one transmission type (e.g., via broadcast/multicast/dedicated higher layer cellular [e.g., RRC] or D2D signaling and/or a physical channel for cellular DL or D2D), depending on which the D2D enabled node or UE will or will not apply TPC for D2D received via a control channel;
   Not signaling all necessary PC parameters to the D2D enabled node or UE or signaling a pre-defined combination of them or some pre-defined value for at least one of them may also be implicit signaling of turning off and vice versa;
Turning on or turning off the TPC for at least one transmission type (e.g., via broadcast/multicast/dedicated higher layer cellular [e.g., RRC] or D2D signaling and/or a physical channel for cellular DL or D2D), depending on which the D2D enabled node or UE will or will not receive TPC for D2D;
   Not signaling all necessary PC parameters to the D2D enabled node or UE or signaling a pre-defined combination of them or some pre-defined value for at least one of them may also be implicit signaling of turning off and vice versa;
Controlling the power control step or the amount of power adjustment for at least one D2D transmission type;
Controlling the range (e.g., from −10 dB to 10 dB) of power control steps or the amounts of power adjustments for at least one D2D transmission type. The range may or may not be limited in time, e.g., valid only for a certain time interval;
Configuring (e.g., via broadcast/multicast/dedicated higher layer cellular or D2D signaling and/or a physical channel for cellular DL or D2D) a specific power control type for at least one transmission type, e.g., accumulated or absolute or some other power control type. Depending on the configured type, the D2D enabled node or UE will apply differently the received TPC for D2D and/or will calculate a different transmit power value for a D2D transmission. Whether the transmissions occur in the same or overlapping time intervals or close to each other in time may also be taken into account;
Configuring the D2D enabled node or UE to use the maximum cellular tx power, including at least one maximum reduction (MPR);
Switching between two or more power control types (e.g., via broadcast/multicast/dedicated higher layer cellular or D2D signaling and/or a physical channel for cellular DL or D2D) for at least one transmission type (e.g., one D2D transmission type or one cellular UL transmission type);
Controlling the absolute or relative frequency of transmission in time of at least one of: TPC for D2D and TPC for cellular UL;
Configuring (e.g., via broadcast/multicast/dedicated higher layer cellular or D2D signaling and/or a physical channel for cellular DL or D2D) the D2D enabled node or UE to use for at least D2D transmission type the TPC for cellular UL
   if there is no TPC for D2D, then only TPC for cellular UL is used for D2D;
   in one embodiment, if there is TPC for D2D, the D2D enabled node or UE may ignore TPC for D2D and use TPC for cellular UL for D2D instead;
   In another embodiment, if there is TPC for D2D, the D2D enabled node or UE may jointly use for D2D the TPC for D2D and TPC for cellular UL;
Configuring the D2D enabled node or UE (e.g., via broadcast/multicast/dedicated higher layer cellular or D2D signaling and/or a physical channel for cellular DL or D2D) to use for D2D at least one of the parameters configured for cellular UL;
Switching (e.g., via broadcast/multicast/dedicated higher layer cellular or D2D signaling and/or a physical channel for cellular DL or D2D) between using and not using for D2D the TPC for cellular UL;
Configuring (e.g., via broadcast/multicast/dedicated higher layer cellular or D2D signaling and/or a physical channel for cellular DL or D2D) the content of the TPC for D2D or adapting it to or jointly with the cellular UL power control configuration;
Deriving TPC for D2D based on cellular UL power control parameters (based on TPC for cellular UL in one specific example) for at least one transmission type.

Controlling cellular UL power control configuration or at least one related parameter is discussed in the following. The controlling of cellular UL power control configuration (may comprise TPC for cellular UL, in one example) or at least one related parameter may comprise, e.g., any one or more of:
Turning on or turning off the cellular UL power control or TPC for cellular UL (e.g., via broadcast/multicast/dedicated higher layer cellular or D2D signaling and/or a physical channel for cellular DL or D2D);
Configuring (e.g., via broadcast/multicast/dedicated higher layer cellular or D2D signaling and/or a physical channel for cellular DL or D2D) a specific power control type, e.g., accumulated or absolute or some other power control type;
Switching (e.g., via broadcast/multicast/dedicated higher layer cellular or D2D signaling and/or a physical channel for cellular DL or D2D) between two or more power control types (e.g., via broadcast/multicast/dedicated higher layer cellular or D2D signaling and/or a physical channel for cellular DL or D2D);
Configuring the D2D enabled node or UE (e.g., via broadcast/multicast/dedicated higher layer cellular or D2D signaling and/or a physical channel for cellular DL or D2D) to use for cellular UL at least one of the parameters configured for D2D;
Switching (e.g., via broadcast/multicast/dedicated higher layer cellular or D2D signaling and/or a physical channel for cellular DL or D2D) between using and not using for D2D the TPC for cellular UL;
Configuring (e.g., via broadcast/multicast/dedicated higher layer cellular or D2D signaling and/or a physical channel for cellular DL or D2D) cellular UL power control or adapting it to or jointly with the TPC for D2D;
Controlling the absolute or relative frequency of transmission in time of at least one of: TPC for D2D and TPC for cellular UL.

Corresponding D2D enabled node or UE embodiments are considered.

The network node may transmit one or more results of the performed controlling described above to a D2D enabled node or UE. The result may comprise a D2D configuration (e.g., TPC for D2D) or D2D power control configuration or at least one parameter and/or cellular UL power control configuration or at least one parameter.

The TPC for D2D may be transmitted via PDCCH or EPDCCH or both.

The D2D enabled node or UE upon receiving the result of the performed controlling, may apply it to one or more of its transmission and/or control its transmission configuration accordingly.

Methods in a D2D enabled node or UE for adapting TPC for D2D communication and/or cellular UL, when the D2D enabled node or UE is operating D2D are discussed in the following.

According to this part, a first D2D enabled node or UE adapts at least one of the:
TPC for D2D, and
cellular UL power control configuration or parameter(s), which may comprise one or more of: TPC for cellular UL, PC parameters such as P0, alpha, Pmax, power backoff or power compensation, etc.;
in order to meet one or more criteria for the D2D enabled node or UE's D2D operation (see example criteria above).

According to this part, the D2D enabled node or UE may implement the following basic steps:
Step 1: Obtain at least one of the: TPC for D2D and cellular UL power control configuration or parameter,
the obtaining may be in one or more ways: from a network node (e.g., eNodeB or D2D server), from another D2D enabled node or UE, based on a pre-defined rule, using pre-defined or pre-configured configurations/parameter(s). A D2D device may comprise a D2D obtaining module for obtaining according to step 1.
Step 2: Perform the adaption on the result of the obtaining performed in the previous step. A D2D device may comprise a D2D adaption module for performing adaption according to step 2.
Step 3: Apply the result of the adaptation to one or both of: at least one D2D transmission and at least one cellular UL transmission. A D2D device may comprise a D2D application module for applying according to step 3.

In the above, the adapting may comprise one or more of: adapting a configuration or at least one parameter, configuring, reconfiguring, etc.

The adaptation may be semi-static or dynamic.

The adaptation may be D2D enabled node or UE autonomous, based on a pre-defined rule, based on D2D enabled node or UE power measurements, controlled by the network node, etc.

In one embodiment, the D2D enabled node or UE receives TPC for D2D and/or cellular UL power configuration or parameters(s) from the network node (corresponding to the step of obtaining) and performed the adapting. In another embodiment, the D2D enabled node or UE may receive a result of the performing the controlling by the network node and apply the adaptation on the result. In yet another embodiment, the D2D enabled node or UE may receive one of the TPC for D2D and cellular UL power control configuration or parameter(s) and performed the adapting on the other one.

In yet another embodiment, the D2D enabled node or UE may receive (as obtaining) at least one of the TPC for D2D and cellular UL power control configuration/parameter(s) on which the network has not performed the controlling and performed the adapting on those.

When both are being adapted, the adapting may be separate/independent (e.g., in time) for TPC for D2D and TPC for cellular UL or joint based on mutual relation between the two. Methods of adapting may be similar to those described for the controlling methods for the network node (Section 6.2), e.g., (re)configuring TPC, (re)configuring a power control parameter, adapting the power control type, etc.

When the D2D enabled node or UE receives an indication from the network node that the network node has performed the controlling or is capable of performing the adapting, it may choose to not perform the adapting itself, instead applying the adapted configuration (which may be received by the D2D enabled node e.g. via transmission of allocation data and/or TPC.

Methods in a second D2D enabled node or UE for controlling TPC for D2D communication for a first D2D enabled node or UE operating D2D are discussed in the following.

According to this part, embodiments described for a network node above are implemented in a second D2D enabled node or UE, which may be seen as a network node in this case.

In one embodiment, the second D2D enabled node or UE implements the embodiments independently of the network or may be considered as a network node. In another embodiment, the second D2D enabled node or UE may receive from a network node the result of the controlling performed by the networked node and send (with or without changes) or forward (e.g., when the second D2D enabled node or UE is a relay D2D enabled node or UE) the result to the first D2D enabled node or UE. In yet another embodiment, the second D2D enabled node or UE may perform controlling on the top of the result of the controlling received from the network node.

Steps in the second D2D enabled node or UE may comprise:
Step 1: Obtaining at least one of the: TPC for D2D and cellular UL power control configuration or parameter. A network device may comprise a NW obtaining module for obtaining according to step 1.
Step 2: Performing controlling on the result of the obtaining step and/or send the final result to the first D2D enabled node or UE. A network device may comprise a NW control module for performing control according to step 2.

Methods of Jointly Using TPC for Cellular UL and TPC for D2D are considered in the following. According to this part, a D2D enabled node or UE may be jointly using TPC for D2D and TPC for cellular UL.

In one embodiment, the D2D enabled node or UE may apply adjustments in both TPCs on at least one D2D transmission.

In another embodiment, the D2D enabled node or UE may dynamically select whether TPC for D2D or TPC for cellular UL should be applied at a certain time on at least one D2D transmission.

In yet another embodiment, the D2D enabled node or UE may apply an adjustment which is a function of the two TPC types, wherein the function, may be, e.g.: maximum of the two, minimum of the two, average of the two, etc. A D2D device may comprise a D2D adjustment module for performing this.

In yet another embodiment, the D2D enabled node or UE decides which TPC type to apply based on the periodicity or frequency in time of the TPCs it receives. For example, it may apply TPC for cellular UL on D2D transmissions when TPCs for D2D are infrequent; it may or may not apply also the TPC for D2D when it is received. A D2D device may comprise a D2D decision module for performing this.

In yet another embodiment, the D2D enabled node or UE keeps track of the amount of the adjustment applied on D2D transmissions (by TPCs for D2D and/or TPCs for cellular UL) and the amount of the adjustment applied on cellular UL transmissions (by TPCs for D2D and/or TPCs for cellular UL). A D2D device may comprise a D2D tracking module for performing this.

The D2D enabled node or UE may then perform one or more operations on the two amounts, e.g., compare, balance or compensate (so one does not exceed too much the other by performing power control on one or both transmission types). A D2D device may comprise a D2D calculation module for performing this.

Controlling the Contents of TPC for D2D and Cellular UL Power Control is discussed in the following. In one example, the contents of a TPC may comprise one or more values indicative of the transmit power adjustment to be made in a D2D enabled node or UE as configured by the TPC. The TPC may or may not indicative of the power control type. The TPC may apply to one specific parameter (e.g., predefined) or may apply to two or more parameters. The TPC may also indicate to which parameters the adjustment applies.

In another example, the contents of TPC may comprise an index or a value which maps to a pre-defined amount of adjustment, impacted parameter, or even a rule how the adjustment should apply. For example:

| TPC Command Field | Adjustment if accumulated PC is configured, [dB] | Adjustment if absolute PC is configured, [dB] |
| --- | --- | --- |
| 0 | −1 | −4 |
| 1 | 0 | −1 |
| 2 | 1 | 1 |
| 3 | 3 | 4 |

In another embodiment, the value in TPC for D2D may account also for additional transmit power adjustments, e.g., include a compensation determined for certain network deployments or a maximum power reduction (MPR) of any one or more types (MPR, P-MPR, A-MPR, etc.) that may be defined for cellular UL and/or D2D.

These approaches may provide
  Better and more flexible control over the interference generated by D2D enabled node or UEs;
  Means in the D2D enabled node or UE and network for D2D power control to meet the described criteria;
  Means in the D2D enabled node or UE and network for cellular UL power control to meet the described criteria;
  Means in the D2D enabled node or UE and network for joint cellular UL and D2D power control;

There is generally disclosed a D2D enabled node, which may be adapted to perform any one or any one combination of the methods and/or comprise any one or any one combination of the features described herein in the context of a D2D enabled node. The D2D enable node may be a node of and/or for a wireless communication network. Alternatively or additionally, a D2D enabled node may be adapted to control its D2D transmit power based on a TPC transmission, in particular based on a TPC transmission from a network node. A corresponding method is also envisioned.

There is also disclosed a network node, which may be adapted to perform any one or any one combination of the methods and/or comprise any one or any combination of the features described herein in the context of a network node. The network node may be a node of and/or for a wireless communication network. Alternatively or additionally, a network node may be adapted to determine a D2D transmit power configuration for a D2D enabled node and/or determine a D2D transmit power-related parameter. The network node may be adapted to transmit the configuration or parameter for D2D power control to a D2D enabled node. A corresponding method is also envisioned.

There is also disclosed a method in a network, which may combine any of the steps of the methods for a D2D enabled node and a network node described herein. The method may in particular be a method in, and/or for D2D operation of, a network.

There are also disclosed one or more software devices, e.g. a D2D device and/or a network device comprising suitable modules adapted to perform the steps of any of the methods described herein.

Generally, there is also disclosed a computer program product comprising instructions executable by control circuitry and/or a computing device, the instruction causing the control circuitry and/or computing device to carry out and/or control any one of the methods described herein when executed by the control circuitry and/or computing device. The control circuitry and/or computing device may be implemented in any one or more than one of the nodes to carry out and/or control corresponding methods or method steps.

Modules performing method steps described herein may generally be implemented in software and/or hardware and/or firmware in and/or on corresponding nodes. Modules of or on or in one node or device, in particular modules for a D2D device or network device, may be implemented in a common module or flow and/or in parallel and/or independent modules or flows and/or share functionality.

The approaches described herein may provide:
  Better and more flexible control over the interference generated by D2D enabled nodes or UEs
  Means in the D2D enabled node or UE and network for D2D power control to meet the described requirements
  Means in the D2D enabled node or UE and network for cellular UL power control to meet the requirements related also to D2D power control
  Means in the D2D enabled node or UE and network for joint cellular UL and D2D power control A D2D enabled node may generally be a node adapted to perform D2D communication, in particular transmission and/or reception, and/or at least one type of D2D operations. In particular, a D2D enabled node may be a terminal and/or user equipment. The D2D enabled node may be adapted to transmit and/or receive D2D data based on allocation data, in particular on and/or utilizing resources indicate in the allocation data. D2D communication and/or transmission by a D2D enabled node may in some variants be in UL resources and/or at least one corresponding carrier or frequency and/or modulation.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein.

A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a user equipment and/or base station and/or relay node and/or any device generally adapted for device-to-device communication. A wireless communication network may comprise at least one of a device configured for device-to-device communication and/or a user equipment and/or base station and/or relay node, in particular at least one user equipment, which may be arranged for device-to-device communication with a second node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes.

A user equipment (UE) may generally be a device configured for wireless device-to-device communication and/or a terminal for a wireless and/or cellular network, in particular a mobile terminal, for example a mobile phone, smart phone, tablet, PDA, etc. A user equipment may be a node of or for a wireless communication network as described herein, in particular a D2D enabled node. It may be envisioned that a user equipment is adapted for one or more RATs, in particular LTE/E-UTRA. A user equipment may generally be proximity services (ProSe) enabled, which may mean it is D2D capable or enabled. It may be considered that a user equipment comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment. It may be considered that a user equipment is configured to be a user equipment adapted for LTE/E-UTRAN.

A base station may be any kind of base station of a wireless and/or cellular network adapted to serve one or more user equipments. It may be considered that a base station is a node of a wireless communication network. A base station may be adapted to provide and/or define one or more cells of the network and/or to allocate frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for device-to-device communication between two nodes of a wireless communication network, in particular two user equipments.

Device-to-device (D2D) communication or operation may generally refer to communication between nodes of a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or coordinating node and/or with a base station or coordinating node providing merely auxiliary services, e.g. configuration data or a transmission configuration or related information for a message intended for device-to-device communication between user equipments. In the latter case, it may be considered that data and/or signals flowing between the nodes performing device-to-device communication are not transported via the base station and/or coordinating node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A message may be considered to be or be represented by a batch of physical layer transmissions and/or may comprise such.

A message may comprise information regarding the transmission configuration, in particular regarding related information, e.g. in a header, and/or a payload. A unidirectional message may be a message for connectionless communication and/or for which no prior communication and/or prior connection between the transmitting node and receiving node is necessary and/or available and/or for which no response or no response protocol or no handshake is expected. A device configured for and/or capable of device-to-device communication, which may be called D2D enabled device or node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Allocated resources may generally be frequency and/or time resources. Allocated resources may comprise frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first D2D enabled node to transmit to and/or for a second D2D enabled node. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more D2D enabled nodes, in particular to a first D2D enabled node. Accordingly, D2D resource allocation may be performed by the network and/or by a node, in particular a node within and/or within a cell of a cellular network covering the D2D enabled nodes participating or intending to participate in the D2D communication.

Allocation data may be considered to be data indicating and/or granting resources allocated by the allocation node, in particular data identifying or indicating which resources are reserved or allocated for D2D communication for a D2D enabled node and/or which resources a D2D enabled node may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. Generally, allocation data may indicate and/or instruct transmission mode and/or configuration, in particular regarding a power level of transmission, e.g. for the first D2D enabled node. The first D2D enabled node may generally be adapted to perform transmission configuration according to allocation data, in particular to set a corresponding power level. It may be considered that allocation data comprises and/or is implemented as TPC and/or in TPC format.

The term "intra-frequency" may refer to issued related to the same frequency/bandwith and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

Receiver switching may generally refer to switch a receiver between D2D operation and cellular operation (or vice versa) and/or to switch between different carriers or frequencies. Receiver sharing may generally described providing a receiver or receiver resource for a different type of operation (D2D or cellular) at least part of the time and/or to use it for different types of operation (D2D or cellular) within a given time interval, e.g. a subframe or frame. Receiver sharing may be arranged or performed by switching the receiver between different operation types or modes, in particular within the given time interval.

Regarding, device-to-device (D2D), in some examples, the terms 'D2D' or 'proximity service' (ProSe) or 'peer-to-peer communication' may be used interchangeably.

A D2D enabled node may be a UE, which may be D2D capable, and may be referred to as D2D capable node or UE. It may comprise any entity or device or node capable of at least receiving or transmitting radio signals on a direct radio link, i.e., between this entity and another D2D capable entity. A D2D-capable device or D2D enabled node may for example be comprised in or comprise a cellular UE, PDA, a wireless device, laptop, mobile, sensor, relay, D2D relay, a small base station employing a UE-like interface, etc.

A D2D enabled node or UE is able to support at least one D2D operation. A D2D enabled node may generally be adapted for cellular operation and/or communication in a wireless communication network. A D2D enabled node may generally comprise radio circuitry and/or control circuitry for wireless communication, in particular D2D operation or communication and cellular operation or communication. A D2D device may be a software/program arrangement arranged to be executable by a hardware device, e.g. control circuitry, and/or storable in a memory of e.g. a UE or terminal, which may provide D2D functionality and/or corresponding control functionality to e.g. a UE or terminal.

A D2D transmission may be considered to be of a different type than a cellular and/or UL transmission. A transmission may pertain to a specific frequency and/or spectrum and/or bandwidth and/or carrier.

D2D operation may comprise any action or activity related to D2D or D2D communication and the term may be used interchangeably with the term D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a D2D enabled node or UE. A D2D receive operation may comprise receiving, by a D2D enabled node, of D2D data and/or signals. A D2D transmit operation may comprise, transmitting, by a D2D enabled node, of D2D data and/or signals. A D2D enabled node performing at least one D2D operation may be considered to be in D2D or D2D mode or in D2D operation.

Cellular operation (in particular by a D2D enabled node or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission may be any transmission by a D2D enabled node or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another D2D device. A D2D transmission may be a unicast, groupcast, or broadcast transmission. A D2D transmission may be on the uplink time-frequency resources of a wireless communication system.

A coordinating or controlling node may be a node or network node that is adapted to schedule, decide and/or select and/or allocate, at least in part, time-frequency resources to be used for at least one of: cellular transmissions and D2D transmissions. The coordinating node may also provide the scheduling information to another node such as another D2D enabled node, a cluster head, a radio network node such as eNodeB, or a network node (e.g. a core network node), MME, positioning node, D2D server, RNC, SON, etc). The network node or coordinating node may communicate with a radio network node. It may be envisioned that a coordinating node may also perform coordination for one or more D2D enabled nodes or UEs. The coordination may be performed in a centralized or distributed manner. A coordinating node may provide the functionality of an allocation node. A network device may be a software/program arrangement arranged to be executable by a hardware device, e.g. control circuitry, and/or storable in a memory of a network node, which may provide D2D functionality and/or corresponding control functionality to e.g. network node.

Regarding the radio spectrum, it should be noted that although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may be a radio network node (which may be adapted for wireless or radio communication, e.g. with a D2D enabled node or a UE) or another network node. A network node generally may be an allocation node or coordinating node. Some examples of the radio network node are a radio base station, eNodeB, a relay node, an access point, a cluster head, RNC, etc. The radio network node may be comprised in a wireless communication network and may also support cellular operation. A network node, in particular a radio network node, comprises radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory. A network node may be considered to be serving a D2D enabled node or UE, if it provides a cell of a cellular network to the served node or D2D enabled node or UE and/or is connected or connectable to the D2D enabled node or UE via and/or for transmission and/or reception and/or UL and/or DL data exchange or transmission.

Multiple carrier frequencies or functionality may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies. A frequency band herein may be FDD, TDD, HD-FDD, or even unidirectional (e.g., DL-only band such as Band 29, in some examples). Multiple carrier functionality may include carrier aggregation functionality.

A D2D enabled node may generally be a node adapted to perform D2D communication, in particular transmission and/or reception, and/or at least one type of D2D operations. In particular, a D2D enabled node may be a terminal and/or user equipment. The D2D enabled node may be adapted to transmit and/or receive D2D data based on allocation data, in particular on and/or utilizing resources indicate in the allocation data. D2D communication and/or transmission by a D2D enabled node may generally be in UL resources and/or corresponding carrier or frequency and/or modulation. In this context, stopping D2D communication in response and/or based on a release message may be considered to correspond to transmitting based on allocation data, wherein the release message may be considered to be allocation data.

The term 'TPC for D2D' used herein may refer to or comprise at least one power control command for one or more of D2D transmissions (e.g., SA, D2D data, D2D synchronization signal, D2D control channel, D2D discovery transmission, any D2D transmission for D2D communication, any D2D transmission for D2D discovery). 'TPC for cellular UL' may comprise or refer to at least one power control command sent by or via a network node or eNodeB to control tx power of one or more cellular UL transmissions. The two different types of TPCs may be sent in the same or separate messages to the D2D enabled node or UE, via the same or different channels or channel types (e.g., PDCCH and/or EPDCCH) and/or be comprises in one set or packet or message of allocation data or in different sets or packets or messages of allocation data.

Transmit power (or power density) may generally refer to the power (or power density) of a signal transmitted or generally to the power of wireless transmission. Transmit power (or power density) may in particular refer to the power (or power density) of a signal transmitted by and/or transmissions of a D2D enabled node or UE. Transmit power generally may refer to a specific channel and/or frequency and/or cell and/or carrier and/or bandwidth and/or carrier aggregate and/or a general setup. UL transmit power, or shorter UL power, may refer to the power of a signal transmitted, in particular by a D2D enabled node or UE, in cellular operation and/or to or for a network node serving the D2D enabled node or UE, for example a base station or eNodeB. D2D transmit power (or power density) may refer to the power (or power density) of a signal transmitted, in particular by a D2D enabled node or UE, in D2D operation and/or for D2D transmission. Transmit power (or power density) may refer to or pertain to a time unit or interval, e.g. a slot, subframe or frame, and/or transmit power control may be performed for and/or updated in such units or intervals. Power control or transmit power control may generally refer to control of transmit power and/or transmit power spectral and/or temporal density. Power control commands in TPC format or TPC may be used for controlling power and/or to cause a D2D enabled node or UE receiving at least one such command or TPC message to control power based on and/or according to the command or TPC. The command or TPC may be transmitted to the D2D enabled node from or via a network node, in particular a base station or eNB or allocating node.

Some useful abbreviations are:
3GPP $3^{rd}$ Generation Partnership Project
Ack/Nack Acknowledgment/Non-Acknowledgement, also NN
ACLR Adjacent Channel Leakage Ratio
AP Access point
BER/BLER Bit Error Rate, BLock Error Rate;
BS Base Station
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a UE; often uses specified spectrum/bandwidth different from UL (e.g. LTE) eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimisation of Drive Test
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINR/SNR Signal-to-Noise-and-Interference Ratio; Signal-to-Noise Ratio SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions.

Moreover, there are discussed ProSe or D2D resource grant procedure and the grant contents.

There may be considered open loop power control mechanism to be specified for in-coverage UEs for Mode 2 communication and Type 1 and Type 2 discovery Values of $P_0$ and alpha are signaled by higher layers Different values of $P_0$ and alpha can be used for Type 1 discovery, Type 2 discovery, and communication One of the values of alpha available is 0

Values of $P_0$ and alpha that lead to transmission at Pcmax by all UEs are supported D2D Communication:

For communication Mode 1, the current PUSCH UL PC is baseline

Values of P0 and alpha for Mode 1 D2D communication are configured by eNB

P0 and alpha for D2D can be different from P0 and alpha for WAN eNB-UE path loss is used not UE-UE path loss.

X bits TPC command is conveyed in D2D grant

FFS: X bits (X>0)

FFS whether power control parameters are the same between SA and data

FFS whether accumulate PC or absolute PC

FFS boosting range is different from cellular

Maximum power transmission is not precluded

Power control for D2D may enable means for reducing unwanted emissions and intra-carrier interference in general. However, there are still some aspects that need to be addressed since they may cause challenges which are summarized in Table 1 below, where for the sake of compactness there are used the following notation: P_D2D for D2D tx power, P_UL for cellular tx power, Pd_D2D for D2D tx power spectral density, and Pd_UL for cellular UL tx power spectral density.

TABLE 1

On some remaining issues with D2D tx power PC

| Observation | Possible Reasons | Impact | Possible Solutions |
| --- | --- | --- | --- |
| Large difference between P_D2D and P_UL or Pd_D2D and Pd_UL for transmissions from the same UE on the same carrier | Large difference in P0 values for cellular UL and D2D. Different frequency of TPCs for D2D and UL (grants periodicity may be different). D2D TPC does not follow cellular TPC. Different PC steps for P_D2D and P_UL (D2D link quality depends also on speed of the other UE, etc.). Different QoS requirements for D2D and cellular UL. | System: P_D2D>>P_UL may result in much higher interference in the UL spectrum than for which the network is dimensioned. UE and system: P_D2D>>P_UL or P_D2D<<P_UL in adjacent subframes may degrade power control accuracy for D2D and/or cellular UL | The maximum difference between P_D2D and P_UL or Pd_D2D and Pd_UL on the same carrier is restricted or controlled by the network |
| Large difference between P_D2D and P_UL or Pd_D2D and Pd_UL for transmissions from the same UE on different carriers | Independent D2D and cellular UL PC on different carriers. Independent TPCs on different carriers. Different QoS requirements for D2D and cellular UL. | System: Higher unwanted emissions than the netwok may be dimentioned for. | The maximum difference between P_D2D and P_UL or Pd_D2D and Pd_UL on different carriers is restricted or controlled by the network. |
| Mismatch in the reference UE total tx power in the PC calculation for cellular and D2D transmissions | Cellular UL UE are configured with different maximum power reductions (MPRs) in different co-existence scenarios, which is currently not done for D2D UEs | If not done for D2D UEs, the D2D UEs may cause interference issues. | Maximum power reductions (MPR) should be possible to configure also for UE D2D transmissions. |
| TPC commands for D2D may be infrequent | Determined by the periodicity of grants and the periodicity of the power-controlled | A mismatch between the cellular UL transmit power and D2D power may grow rapidly, | |

TABLE 1-continued

On some remaining issues with D2D tx power PC

| Observation | Possible Reasons | Impact | Possible Solutions |
| --- | --- | --- | --- |
| The network may be not fully aware of the actual D2D transmit power as well as of the total power used by the UE | D2D transmissions There is no power head room reporting (PHR) accounting for D2 transmissions | depending on how frequent the cellular TPC is. Power control for D2D may be challenging | |

Observation 1: The maximum difference between P_D2D and P_UL or Pd_D2D and Pd_UL may need be restricted or controlled by the network.

On PC and TPC for SA and D2D Data

TPC may be included in D2D resource grants, but may differ for SA and D2D data. If SA cycles and D2D data scheduling cycles are the same and aligned, the same TPC for SA and D2D data may be sufficient.

Proposal 1: The same TPC for SA and D2D data are configured in a D2D resource grant, at least when the SA and D2D scheduling cycles are the same and aligned.

Proposal 2: Cellular UL DCI0 TPC format (2 bits) may be reused for D2D grant for the agreed TPC, but the tx power adjustment steps do not need to be exactly the same as for cellular UL PC.

Proposal 3: The same power control type (e.g., absolute) is used for SA and D2D data.

Proposal 4: The TPC for D2D should also have a possibility to configure 'no-tx-power-adjustment'.

Proposal 5: Higher-layer signalling should allow for turning on/off using of the TPCs signalled in D2D resource grants.

Impact of D2D Power Boosting on Cellular UE Satisfaction

Figure 7:
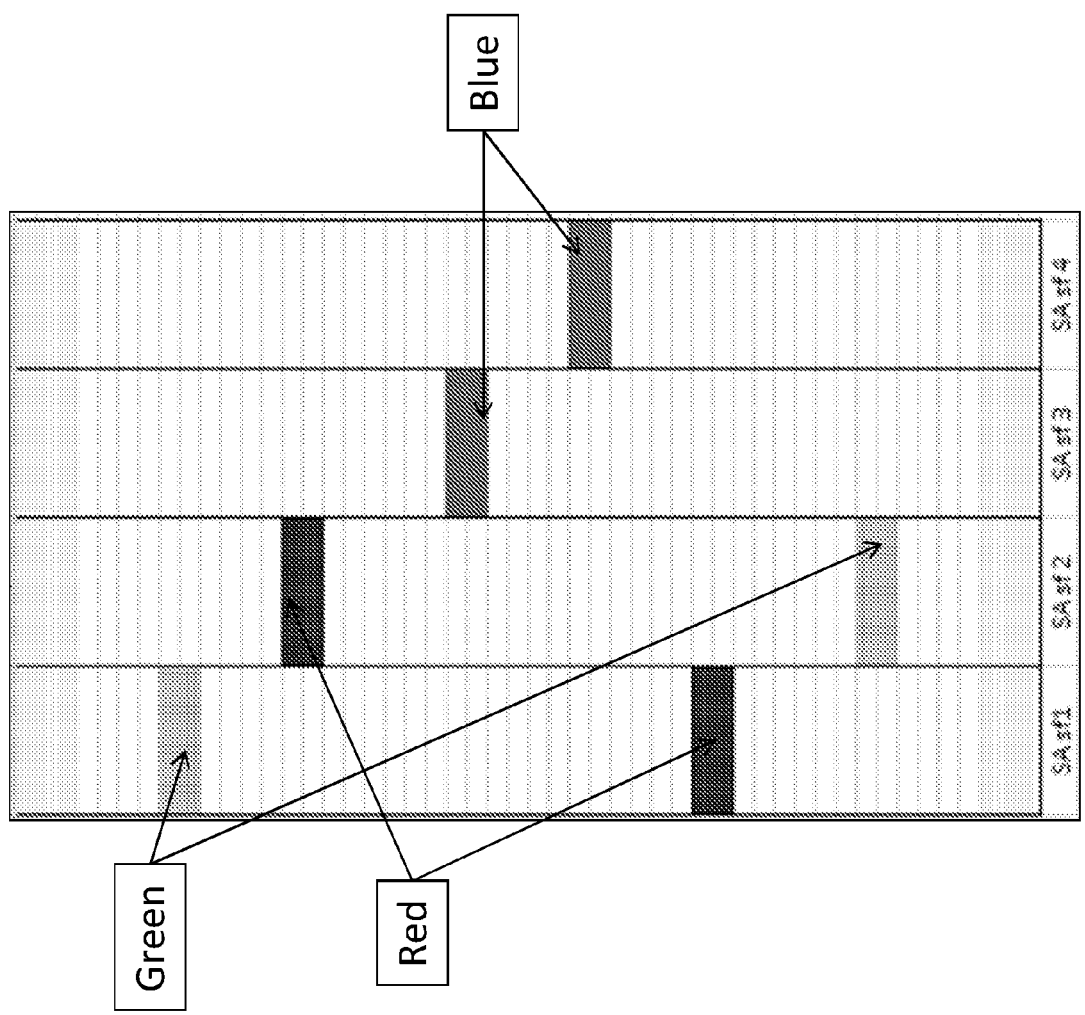
FIG. 7 a scheduling assignment (SA) allocation for D2D UEs in SA subframes.

The impact of D2D power boosting for SA transmission on cellular UE satisfaction is further studied here by simulations. Two scenarios are simulated, Scenario 1 (500 m, mix in/outdoor, 2 GHz) and Scenario 3 (1732 m, uniform outdoor, 700 MHz). The inband emission model is as in 3GPP 36.101, W/X/Y/Z=[0 0 0 0]. D2D tx power model: open-loop power control, Ptx=PL+Prx, Prx=noise power+20/30/40 dB. 2 SA RBs are scheduled per D2D transmitter for SAs transmitted in 2 out of 4 SA subframes by each D2D transmitter. For cellular UE, closed loop PC is simulated with target SNR=5 dB. Further, it was assumed: 3 RBs for PUCCH (1 RB per UE in RR), 4 RB as a guard band, and the rest of the 10 MHz bandwidth is for D2D. Frequency hopping is assumed for SAs, as shown in FIG. 7 below, which shows SA allocation for 3 D2D UEs (green, red, blue) in SA subframes.

Figure 8:
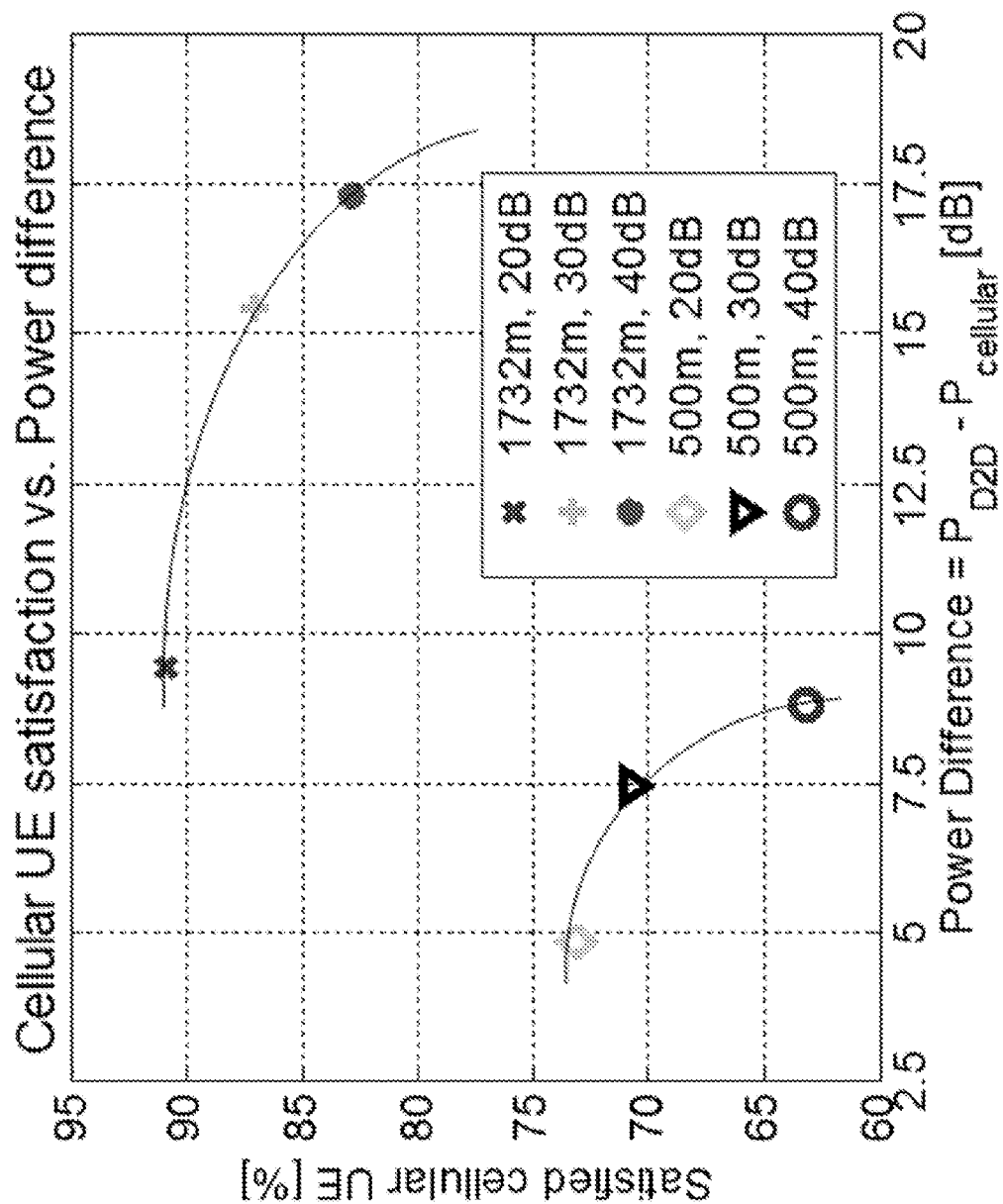
FIG. 8 a cellular UE satisfaction in a wireless communication network as a function of difference of UEs' D2D tx power and cellular tx power.

FIG. 8 illustrates cellular UE satisfaction in the network as a function of the difference of UEs' D2D tx power and cellular tx power (per RB), where the power difference is the $50^{th}$%-ile in the CDF of the UEs' D2D tx power offset to their cellular tx power. A cellular UE is configured satisfied if it gets BLER<0.01 for cellular PUCCH. As can be seen in the figure, the number of satisfied cellular UEs drops rapidly with increasing the D2D power offset in the network.

The results are still ideal since they do not account for such impacts as, e.g., timing misalignment of SA transmissions, which have DL timing as a reference, with cellular UL transmissions.

Observation 2: D2D tx power boosting over cellular tx power may under specific circumstances degrade the cellular UE performance.

Proposal 6: The maximum positive difference of D2D tx power and cellular UL tx power (i.e., D2D boosting over cellular UL) may be restricted or controlled by the network.

Proposal 7: Maximum power reductions (MPRs) may be possible to configure also for UE D2D transmissions, including the D2D transmission at maximum power.

FIG. 8 shows cellular UE satisfaction in the network as a function of the $50^{th}$%-ile of the UEs' D2D power offset over the their cellular tx power (per RB).

The following has been observed and is proposed:

Observation 1: The maximum difference between P_D2D and P_UL or Pd_D2D and Pd_UL may be restricted or controlled by the network.

Observation 2: D2D tx power boosting over cellular tx power, if used at all, may be carefully and/or strictly controlled, to not degrade the cellular UE performance.

Proposal 1: The same TPC for SA and D2D data are configured in a D2D resource grant, at least when the SA and D2D scheduling cycles are the same and aligned.

Proposal 2: Cellular UL DCI0 TPC format (2 bits) may be reused for D2D grant for the agreed TPC, but the tx power adjustment steps do not need to be exactly the same as for cellular UL PC.

Proposal 3: The same power control type (e.g., absolute) may be used for SA and D2D data.

Proposal 4: The TPC for D2D may have a possibility to configure 'no-tx-power-adjustment'.

Proposal 5: Higher-layer signalling should allow for turning on/off using of the TPCs signalled in D2D resource grants.

Proposal 6: The maximum positive difference of D2D tx power and cellular UL tx power (i.e., D2D boosting over cellular UL) may be restricted or controlled by the network.

Proposal 7: Maximum power reductions (MPRs) may be possible to configure also for UE D2D transmissions, including the D2D transmission at maximum power.

The invention claimed is:

1. A method for operating a device-to-device (D2D) enabled node, the method comprising:
   controlling D2D transmit power of the D2D enabled node, wherein the controlling comprises:
   obtaining at least one D2D parameter;
   adapting, based on power control rules, the at least one D2D parameter to control the D2D transmit power of the D2D enabled node;
   adapting a D2D transmit power configuration to meet the power control rules; and
   using at least one of the adapted at least one D2D parameter and the adapted D2D transmit power configuration to configure the D2D transmit power for at least one D2D signal, wherein the power control rules indicate:
  a difference between a total D2D transmit power of the D2D enabled node and a total cellular transmit power of the D2D enabled node, in an overlapping subframe on a same carrier frequency, does not exceed a threshold; and
  the configured D2D transmit power of the D2D enabled node does not exceed a sum of a cellular transmit power of the D2D enabled node on the same carrier frequency and an offset.

2. A device-to-device (D2D) enabled node for a wireless communication network, the D2D enabled node being configured to control D2D transmit power of the D2D enabled node, wherein the D2D enabled node comprises control circuitry, the control circuitry being configured to:
  obtain at least one D2D parameter;
  adapt, based on power control rules, the at least one D2D parameter to control the D2D transmit power of the D2D enabled node;
  adapt a D2D transmit power configuration to meet the power control rules; and
  use at least one of the adapted at least one D2D parameter and the adapted D2D transmit power configuration to configure the D2D transmit power for at least one D2D signal,
  wherein the power control rules indicate:
    a difference between a total D2D transmit power of the D2D enabled node and a total cellular transmit power of the D2D enabled node, in an overlapping subframe on a same carrier frequency, does not exceed a threshold; and
    the configured D2D transmit power of the D2D enabled node does not exceed a sum of a cellular transmit power of the D2D enabled node on the same carrier frequency and an offset.

3. A method for operating a network node in a wireless communication network, the method comprising:
  obtaining at least one device-to-device (D2D) parameter;
  determining a D2D transmit power configuration based on the at least one D2D parameter; and
  adapting the D2D transmit power configuration to meet power control rules, wherein the power control rules indicate:
    a difference between a total D2D transmit power of a D2D enabled node and a total cellular transmit power of the D2D enabled node, in an overlapping subframe on a same carrier frequency, does not exceed a threshold; and
    a D2D transmit power of the D2D enabled node does not exceed a sum of a cellular transmit power of the D2D enabled node on the same carrier frequency and an offset.

4. A network node for a wireless communication network, the network node comprising control circuitry, the control circuitry being configured to:
  obtain at least one device-to-device (D2D) parameter;
  determine a D2D transmit power configuration based on the at least one D2D parameter; and
  adapt the D2D transmit power configuration to meet power control rules, wherein the power control rules indicate:
    a difference between a total D2D transmit power of a D2D enabled node and a total cellular transmit power of the D2D enabled node, in an overlapping subframe on a same carrier frequency, does not exceed a threshold; and
    a D2D transmit power of the D2D enabled node does not exceed a sum of a cellular transmit power of the D2D enabled node on the same carrier frequency and an offset.

5. A non-transitory computer readable storage medium storing instructions executable by control circuitry, the instructions when executed causing the control circuitry to perform a method for operating a device-to-device (D2D) enabled node, the method comprising:
  controlling D2D transmit power of the D2D enabled node, wherein the controlling comprises:
  obtaining at least one D2D parameter;
  adapting, based on power control rules, the at least one D2D parameter to control the D2D transmit power of the D2D enabled node;
  adapting a D2D transmit power configuration to meet the power control rules; and
  using at least one of the adapted at least one D2D parameter and the adapted D2D transmit power configuration to configure the D2D transmit power for at least one D2D signal, wherein the power control rules indicate:
    a difference between a total D2D transmit power of the D2D enabled node and a total cellular transmit power of the D2D enabled node, in an overlapping subframe on a same carrier frequency, does not exceed a threshold; and
    the configured D2D transmit power of the D2D enabled node does not exceed a sum of a cellular transmit power of the D2D enabled node on the same carrier frequency and an offset.

6. A non-transitory computer readable storage medium storing instructions executable by control circuitry, the instructions when executed causing the control circuitry to perform a method for operating a network node in a wireless communication network, the method comprising:
  obtaining at least one device-to-device (D2D) parameter;
  determining a D2D transmit power configuration based on the at least one D2D parameter; and
  adapting the D2D transmit power configuration to meet power control rules, wherein the power control rules indicate:
    a difference between a total D2D transmit power of a D2D enabled node and a total cellular transmit power of the D2D enabled node, in an overlapping subframe on a same carrier frequency, does not exceed a threshold; and
    a D2D transmit power of the D2D enabled node does not exceed a sum of a cellular transmit power of the D2D enabled node on the same carrier frequency and an offset.

* * * * *